United States Patent
Majumdar et al.

(10) Patent No.: US 12,294,938 B2
(45) Date of Patent: May 6, 2025

(54) MOBILITY TRAFFIC DROP SOLUTIONS FOR EVPN-BASED NETWORKING SYSTEMS

(71) Applicant: Ruckus IP Holdings LLC, Claremont, NC (US)

(72) Inventors: Kausik Majumdar, San Ramon, CA (US); Sridhar Malarouthu, Pleasanton, CA (US); Gefan Zhang, San Jose, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 386 days.

(21) Appl. No.: 17/832,983

(22) Filed: Jun. 6, 2022

(65) Prior Publication Data

US 2022/0394603 A1 Dec. 8, 2022

Related U.S. Application Data

(60) Provisional application No. 63/197,573, filed on Jun. 7, 2021.

(51) Int. Cl.
*H04W 48/16* (2009.01)
*H04W 4/02* (2018.01)
*H04W 36/32* (2009.01)

(52) U.S. Cl.
CPC ........... *H04W 48/16* (2013.01); *H04W 4/027* (2013.01); *H04W 36/322* (2023.05)

(58) Field of Classification Search
CPC ... H04W 48/16; H04W 4/027; H04W 36/322; H04W 12/03; H04W 36/026;
(Continued)

(56) References Cited

U.S. PATENT DOCUMENTS

2001/0034239 A1* 10/2001 Yamato ............ G08G 1/096716
455/524
2009/0047970 A1* 2/2009 Kim ...................... H04W 28/26
455/450
(Continued)

FOREIGN PATENT DOCUMENTS

EP 1537703 A1 6/2005
EP 1793538 A2 6/2007

OTHER PUBLICATIONS

"PCT Search Report and Written Opinion in corresponding patent application No. PCTUS22032300 mailed Nov. 3, 2022, 25 pages".

*Primary Examiner* — Nimesh Patel
(74) *Attorney, Agent, or Firm* — Myers Bigel, P.A.

(57) ABSTRACT

Mobility traffic drop solutions for EVPN-based networking systems that reduce delays related to a device reassociating from one access point to a different access point. For example, a method may include learning information related to a path of a mobile device configured to travel in a physical space along the path; identifying a plurality of access points having coverage areas that provide service to locations along the path and a plurality of networking tunnel endpoints servicing the plurality of access points; assigning the plurality of networking tunnel endpoints to a mobility zone associated with the mobile device; and transmitting data from a source to at least two of the networking tunnel endpoints of the mobility zone.

20 Claims, 16 Drawing Sheets

(58) Field of Classification Search
CPC ..... H04W 84/12; H04W 4/029; H04W 40/18;
H04W 40/20; H04W 40/30; H04W 40/24;
H04W 72/23; H04W 72/0446; H04W
4/70; H04W 4/40; H04W 72/56; H04W
76/15; H04W 28/0289; H04W 48/18;
H04W 60/005; H04W 72/02; H04W
72/04; H04W 72/54; H04W 74/02; H04W
84/005; H04W 80/02; H04W 72/1268;
H04W 72/21; H04W 48/12; H04W 76/11;
H04W 52/42; H04W 64/00; H04W
74/0808; H04W 16/14; H04W 36/0077;
H04W 72/0453; H04W 72/20; H04W
76/19; H04W 88/04; H04W 92/18; H04W
48/20; H04W 52/383; H04W 72/12;
H04W 28/0236; H04W 4/02; H04W 4/08;
H04W 56/0015; H04W 60/04; H04W
76/14; H04W 8/24; H04W 88/16; H04W
12/009; H04W 12/104; H04W 12/63;
H04W 40/02; H04W 40/36; H04W 36/18;
H04W 36/10; H04W 4/50; H04W
52/0258; H04W 72/30; H04W 88/08;
H04W 92/02; H04L 12/4633; H04L
5/0053; H04L 5/001; H04L 5/0044; H04L
5/14; H04L 27/261; H04L 27/2613; H04L
5/0012; H04L 5/0016; H04L 5/0023;
H04B 7/0404; H04B 7/0617; H04B
7/0626; H04B 7/0695; H04B 7/088;
H04B 1/713; H04B 1/7143; H04B
7/06956; H04B 7/06966; H04B 7/0632;
H04B 7/18541; G01S 1/0428; G01S 5/06;
G01S 5/0081; G06N 20/00; G06N 3/04;
G06N 3/08; G06N 5/022

See application file for complete search history.

(56) References Cited

U.S. PATENT DOCUMENTS

| | | | |
|---|---|---|---|
| 2009/0185522 A1* | 7/2009 | Periyalwar | H04W 4/06 370/328 |
| 2015/0092676 A1 | 4/2015 | Periyalwar et al. | |
| 2020/0162889 A1 | 5/2020 | Desai et al. | |

* cited by examiner

MOBILITY TRAFFIC DROP SOLUTIONS FOR EVPN-BASED NETWORKING SYSTEMS

CROSS-REFERENCE TO RELATED APPLICATION

The present application claims the benefit of priority to U.S. Provisional Application No. 63/197,573, filed on Jun. 7, 2021, in the United States Patent and Trademark Office, and the entire contents of the above-identified application are incorporated by reference as if set forth herein.

TECHNICAL FIELD

The present disclosure is related to networking systems and devices, and in particular is related to networking systems and devices configured to provide traffic drop solutions for mobile devices within the networking systems.

BACKGROUND

Networking systems and computing devices are of increasing interest and importance. Networking systems include computing devices such as routers and switches that determine and direct data traffic through one or more networks of interconnected computing devices, such as local area networks (LANs), wide area networks (WANs), and/or the Internet. Switches are devices at the data link layer, or layer 2 of the Open Systems Interconnection (OSI) networking model. A switch takes in or receives data from a first computing device connected to a first port of the switch, and then forwards or transmits the data to a second computing device connected to a second port of the switch. The first and second computing devices may be, as examples, computers, servers, printers, or other switches. Routers are computing devices at the network layer, or layer 3 of the OSI networking model. A router works to direct the flow of the data across the network, in part by choosing a route for the data. The data may be encapsulated in various containers at different layers in the networking module. Networking systems and computing devices are being deployed in ever-increasing numbers in many different applications and fields.

One area in which networking systems and computing devices have become increasingly important involves the transportation and tracking of goods. Individual consumers and large organizations increasingly demand that a wide variety of goods be delivered on tighter schedules and with assurances that these tighter schedules will be satisfied. For example, many individuals and businesses have come to expect and rely on overnight shipping, same day shipping, and in some cases, same hour shipping. Consider a typical scenario where goods are ordered from a retailer using software such as a website, mobile application, or ordering system. Although some retailers use "brick and mortar" retail locations and/or small warehouses for local area order fulfillments, the dominant business model thus far has been to use large warehouses and expedited shipping services, since this enables retailers to offer many different products beyond what could be stored in a "brick and mortar" location open to the public. One prominent retailer is estimated to offer over 10 million different products (SKUs) on their website, and can deliver at least some of these products from their warehouses to customers in as little as 2 hours.

The physical space and layout that is required to enable the picking of items from inventory and packing the items into receptacles for shipping can be quite large, with some warehouses sized at hundreds of thousands of square feet, or even over a million square feet. Retailers rely on human workers to pick and pack the items needed to fulfill and order. These human workers are typically provided with a network-connected computing device to indicate to the human worker what item is to be picked next from inventory and where the item is located in the warehouse.

Mobile automated workers, which may be referred to as mobile robots, are also deployed in warehouses that support retail, transport, and shipping operations, as examples. These robots typically do not pick items from shelves, but may move around parcels or bins with inventory as part of automated tasks. For example, a human worker may stay in a location while mobile robots bring bins of inventory to the human worker from other locations within the warehouse, though a variety of mobile robot tasks are currently implemented and in development. This can improve an efficiency of the warehouse for example because the mobile robots are able to coordinate their movements (either by a centralized control system or via negotiation between two or more mobile robots), because mobile robots require less space and distancing between themselves to move than human workers, and because mobile robots require less time than human workers to reorient themselves within the warehouse in between tasks.

SUMMARY

Some embodiments of the present disclosure provide methods. A first example of a method provided by the present disclosure may include: including learning information related to a path of a mobile device configured to travel in a physical space along the path; identifying a plurality of access points having coverage areas that provide service to locations along the path and a plurality of networking tunnel endpoints servicing the plurality of access points; assigning the plurality of networking tunnel endpoints to a mobility zone associated with the mobile device; and transmitting data from a source to at least two of the networking tunnel endpoints of the mobility zone. In some embodiments, the method may include establishing a multicast group using the plurality of networking tunnel endpoints assigned to the mobility zone transmitting the data from the source to the at least two networking tunnel endpoints of the mobility zone may include transmitting the data via a multicast stream. For example, transmitting the data from the source to the at least two networking tunnel endpoints of the mobility zone may include transmitting the data via at least one replicated unicast stream. In some embodiments, the method may include forwarding the data received by the networking tunnel endpoints to access points of the plurality of access points serviced by the receiving networking tunnel endpoints. In some embodiments, the method may include dropping, by at least one of the access points, the data forwarded thereto based on a lack of a connection between the access point and the mobile device. In some embodiments, the method may include dropping, by one of the receiving networking tunnel endpoints, the data received thereby based on a lack of a connection between the mobile device and any access point serviced by the one networking tunnel endpoint. In some embodiments, the transmitting of the data from the source to the at least two networking tunnel endpoints of the mobility zone may be performed responsive to receiving a reassociation request from the mobile device at a second access point of the plurality of access points. In some embodiments, the data may be transmitted from the source to the at least two networking tunnel endpoints of the mobility zone via first and second unicast data streams. In some embodiments, the methods may include: receiving an indication that the mobile device has reassociated with the second access point of the plurality of access points; and discontinuing one of the first and second unicast data streams. For example, the indication may include a route advertisement indicating that the mobile device may be available via the second access point or indicating that the mobile device may be available via a networking tunnel endpoint servicing the second access point. The indication may include a withdrawal request from the source by a first access point.

A second example of a method provided by the present disclosure may include: receiving, by a controller, a message transmitted to the controller from a second access point of a plurality of access points providing service within a physical space, where the message may be transmitted by the second access point based on a reassociation request received by the second access point from a first mobile device; identifying, by the controller, a source of data transmitted to the first mobile device via a network communicatively coupled to the plurality of access points; and transmitting a message from the controller to the source indicating the source may be to transmit data to at least two networking tunnel endpoints of the network, at least one of which services the second access point. In some embodiments, the message transmitted from the controller may indicate the networking tunnel endpoint that services the second access point. In some embodiments, the method may include transmitting, by the source, the data to the at least two networking tunnel endpoints of the network. In some embodiments, the source may be configured to transmit the data to the at least two networking tunnel endpoints via a multicast stream. In some embodiments, the source may be configured to transmit the data to the at least two networking tunnel endpoints via at least one replicated unicast stream. In some embodiments, the method may include: receiving, by the source, an indication that the first mobile device has reassociated with the second access point; and discontinuing transmission to one of the at least two networking tunnel endpoints in response to the indication. In some embodiments, the indication may include a route advertisement indicating that the first mobile device may be available via the second access point or indicating that the first mobile device may be available via a networking tunnel endpoint servicing the second access point. In some embodiments, the indication may include a withdrawal request from the source by a first access point.

Some embodiments of the present disclosure provide systems. A first example of a system provided by the present disclosure may include: a plurality of access points configured to provide wireless communication to a plurality of mobile devices within a physical space; a plurality of networking tunnel endpoints that provide service the plurality of access points with service to a network; and a controller. The controller may be configured to: learn information related to a path of a first mobile device configured to travel within the physical space along the path; identify at least some of the plurality of access points as having coverage areas that provide service to locations along the path and at least two networking tunnel endpoints that service the identified access points; assign at least two of the networking tunnel endpoints to a mobility zone associated with the mobile device; and transmit data to the first mobile device via the at least two networking tunnel endpoints assigned to the mobility zone.

As another example, a system according to the present disclosure may include a plurality of access points configured to support wireless communication within a physical space. The system may include a plurality of networking tunnel endpoints that provide the plurality of access points with service to a network. The system may include a source configured to transmit data to a first mobile device via the network. The system may include a controller, configured to: receive a message transmitted to the controller from a second access point of the plurality of access points based on a reassociation request received by the second access point from the first mobile device; identify the source; transmit a message to the source; and transmit data to at least two networking tunnel endpoints in response to receiving the message from the controller.

The present disclosure is not limited to these examples, and other methods, systems, and devices are provided herein.

BRIEF DESCRIPTION OF THE DRAWINGS

Like reference numerals refer to corresponding parts throughout the drawings. Moreover, multiple instances of the same part may be designated by a common prefix separated from an instance number by a dash.

DETAILED DESCRIPTION

Networking systems and computing devices, whether deployed in the retail, transport, and shipping operations discussed above or elsewhere, have also grown increasingly complex. Various developments have been identified and are summarized in the next several paragraphs, with the understanding that the following are high-level overviews which may lack specific implementation details.

1. Wireless Communication and Roaming. Electronic devices or components in a wireless system communicate packets in accordance with a wireless communication protocol, such as a wireless communication protocol that is compatible with an IEEE 802.11 standard (which is sometimes referred to as 'Wi-Fi®,' from the Wi-Fi Alliance of Austin, Texas), although other wireless communication protocols have been developed and deployed and the present disclosure is not limited to Wi-Fi.

Figure 1:
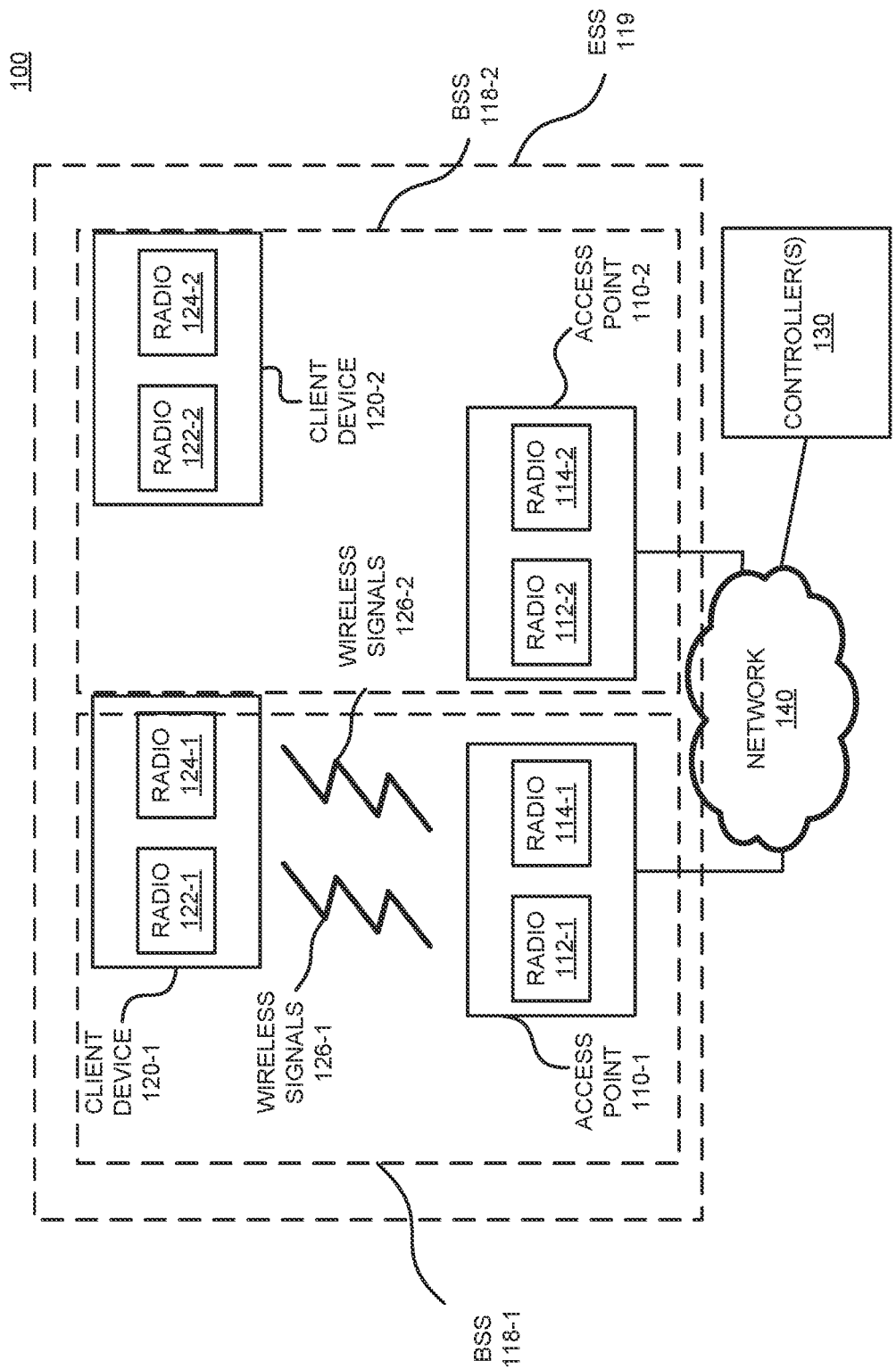
FIG. 1 is a block diagram illustrating an example of a wireless communication system according to aspects of the present disclosure.

FIG. 1 is a block diagram illustrating a very simple, example Wi-Fi network 100 in which the communication techniques according to embodiments of the present disclosure may be practiced. As shown in FIG. 1, the Wi-Fi network 100 may include one or more access points 110, one or more client devices 120 (such as cellular telephones, computers, tablets, printers and a wide range of other Wi-Fi-capable electronic devices), and one or more optional controllers 130. The access points 110 may communicate with one or more of the client devices 120 using wireless communication that is compatible with an IEEE 802.11 standard. Thus, the wireless communication may occur in, for example, the 2.4 GHz frequency band, the 5 GHz frequency band and/or the 60 GHz frequency band. However, other frequency bands may be used, and it will be appreciated that future versions of the IEEE 802.11 standards may operate in additional or different frequency bands, such as, for example, the 6 GHz frequency band.

The access points 110 may also communicate with the one or more optional controllers 130 via a network 140, which may comprise, for example, the Internet, an intra-net and/or one or more dedicated communication links. It will also be appreciated that some access points 110 may only be connected to the network 140 through other access points 110 (e.g., in a mesh network implementation). Note that the optional controllers 130 may be at the same location as the other components in Wi-Fi network 100 or may be located remotely (e.g., cloud based controllers 130). The access points 110 may be managed and/or configured by the one or more optional controllers 130. The access points 110 may communicate with the controller(s) 130 or other services using wireless communications and/or using a wired communication protocol, such as a wired communication protocol that is compatible with an IEEE 802.3 standard (which is sometimes referred to as 'Ethernet'), e.g., an Ethernet II standard. The access points 110 may provide the client devices 120 access to network 140. The access points 110 may be physical access points or may be virtual or 'software' access points that are implemented on a computer or other electronic device. While not shown in FIG. 1, the Wi-Fi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 12, the access points 110, client devices 120 and/or the controllers 130 may include subsystems, such as a networking subsystem, a memory subsystem and a processor subsystem. The networking subsystems may include radios that are used to wirelessly communicate with each other. For example, the access points may include a first radio 112 that is configured to transmit and receive signals in a first frequency band (e.g., the 2.4 GHz frequency band), and a second radio 114 that is configured to transmit and receive signals in a second frequency band (e.g., the 5 GHz frequency band). Similarly, the client devices 120 likewise may include a first radio 122 that is configured to transmit and receive signals in the first frequency band (e.g., the 2.4 GHz frequency band), and a second radio 124 that is configured to transmit and receive signals in the second frequency band (e.g., the 5 GHz frequency band).

As can be seen in FIG. 1, wireless signals 126-1 (represented by a jagged line) are transmitted from the 2.4 GHz radio 122-1 in client device 120-1. These wireless signals are received by the 2.4 GHz radio 112-1 in at least one of the access points 110, such as access point 110-1. Likewise, wireless signals 126-2 (represented by a jagged line) are transmitted from the 5 GHz radio 124-1 in client device 120-1, and may be received by the 5 GHz radio 114-1 of access point 110-1. The wireless signals 126-1, 126-2 may comprise frames or packets that are received by access point 110-1.

In the IEEE 802.11 wireless local area networking standards (including Wi-Fi), a collection of access points 110 may share a common group of configuration parameters, such as radio frequency parameters, security parameters, and modulation parameters. Each of the wireless access points 110 may establish a basic service set (BSS) 118 that other devices, such as mobile devices, may join. This BSS is typically identified by a service set identifier (SSID). The group of basic service sets (i.e., a plurality of basic service sets) may be referred to as an extended service set (ESS) 119 that is also identified by the SSID.

A mobile device may roam among the basic service sets 118 of the extended service set 119 due to the shared common group of configuration parameters. For example, the client device 120-1 may travel from a first BSS 118-1 in a coverage area of the first access point 110-1 to a second BSS 118-2 in a coverage area of the second access point 110-2. From the perspective of the moving client device 120-1 (or the user thereof), the extended service set 119 appears as a single network or basic service set covering a campus or large geographic area, when in reality the client device 120-1 may be serviced by multiple access points 110 and may be part of multiple basic service sets 118 as it moves about the campus. The controller 130 and/or the access points 110 can be configured to handoff communications with the client device 120-1 once it moves from the coverage area of a first access point 110-1 to a coverage area of the second access point 110-2.

In 802.11, switching from a first access point 110 to a second access point 110 is a client-side decision performed by the mobile client device 120. The moving client device 120 listens for beacon frames and/or sends probe requests to discover access point 110 advertising the preferred SSID. The client device 120 uses the received signal strength of beacons or probe responses to make decisions on whether to change to a target access point 110 or remain connected to its current access point 110. When a client device 120 wants to roam to and connect with a second access point 110 that differs from the first access point 110 it is presently connected to, the client device 120 must first establish an association/authentication relationship with the second access point 110, using a series of request and response message exchanges.

In situations where the access points 110 are acting independently of each other, this whole process must occur each time the client device 120 moves to a new access point 110. This may result in a period of time where the client has no network access, because it has disassociated from a first access point 110 and is in the process of associating and authenticating with a second access point 110. This temporary lack of network access can result in packet loss, dropped calls, or other negative performance. IEEE standards have been promulgated to improve roaming and reduce negative performance. 802.11k provides a mechanism for devices to search more quickly for nearby access points 110 that are available as roaming targets. 802.11v allows the network control layer (e.g., controller 130) to influence the behavior of the client device 120 with respect to roaming, for example by providing information related to nearby access points 110 and by indicating to the client device 120 that a disassociation is imminent from the current access point 110 that the client device 120 is connected. In 802.11r, which is the IEEE standard for fast roaming or Fast Transition (FT), an initial authentication handshake can be performed between the client device 120 and the new access point 110 before the client begins the sequence of association messages to the new access point 110. This can reduce the amount of time between when the client device 120 actually performs the reassociation request or response exchange with new target access point 110 and when substantive communication over the established wireless link can occur.

2. Virtualization: An exponential increase in processing capabilities has enabled virtualization techniques to be applied to entire computing devices. A single "bare-metal" hardware server may be configured to run several operating systems and execute several applications while maintaining reliability. Virtualization software such as a hypervisor may create an abstraction layer that enables hardware elements, such as processors, memory, networking resources, and storage to be divided into multiple system virtual machines (VMs). In full virtualization (or system virtualization), each VM runs its own operating system. To applications and end users, the behavior of a VM is comparable to a dedicated computer. Operating-system level virtualization technologies have also been developed in which application code and its dependencies are bundled together in a single package often called a "container," and are packaged so as to be independent of the operating system. Multiple instances of a single software application or container may be run on one or more physical or virtual machines. Each VM and/or each container may be associated by the host operating system or hypervisor with a virtualized Ethernet MAC (media access control) address, so that Ethernet frames and data encapsulated therein can be received by the VM or container.

3. Data Isolation: Segmenting and isolating data traffic within networks may be desirable or advantageous in some situations, for example, so that different devices connected to a network are restricted to only accessing data streams appropriate to the specific device. Although physically separated networks are one option, such networks are also typically impractical. Many layer 2 switching networks use Virtual LANs (VLANs) to provide broadcast isolation. VLAN identifiers (VLAN IDs) can be assigned to network switches and devices and can divide a layer 2 network into multiple broadcast domains. VLAN IDs are 12-bits in length, allowing for slightly fewer than 4096 different VLANs (due to reserved IDs). However, the increasing deployment of VMs has resulted in pressure on this upper limit.

Figure 2:
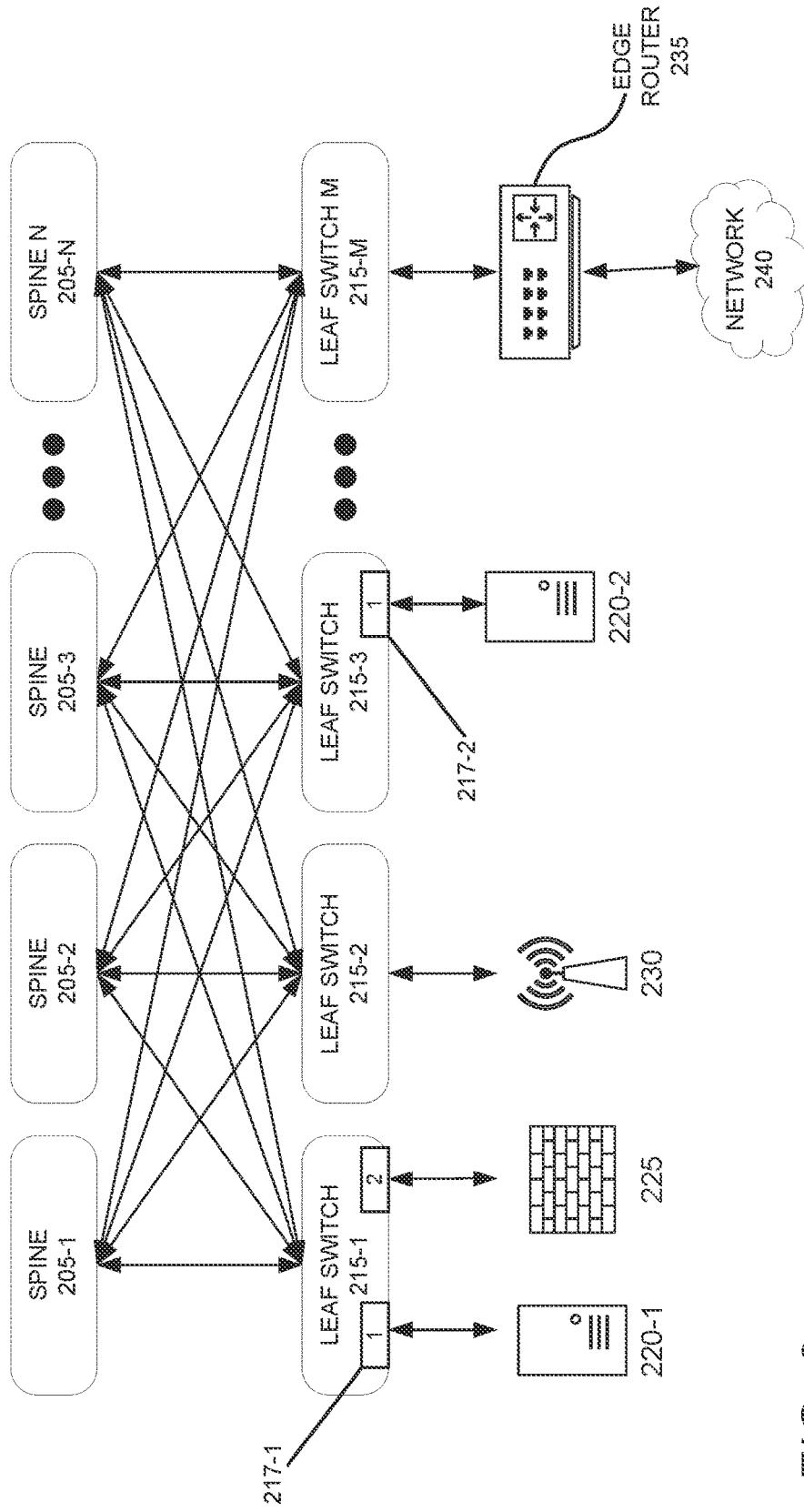
FIG. 2 is a block diagram illustrating an example of a spine-leaf architecture.

VXLANs (Virtual eXtensible Local Area Networks) are one attempt to address the increased demands on networks caused by virtualization, and have some similarities to VLANs. A VXLAN is typically regarded as a layer 2 overlay network across or on an underlying layer 3 network. In some embodiments, the underlying network is a spine-leaf architecture or Clos architecture, an example of which can be seen in FIG. 2. In a spine-leaf architecture such as in example network 200, each of a set of spine switches 205 is connected with each of a set of leaf switches 215. In other words, the first spine switch 205-1 is connected to the first leaf switch 215-1, the second leaf switch 215-2, and so on. No connections are formed among the spine switches 205 (or, in other words, there are no spine-spine links) and no connections are formed among the leaf switches 215 (or, in other words, there are no leaf-leaf links). Computing devices such as servers 220, firewalls 225, access points 230, and edge routers 235 (which may enable connection to other networks 240) are connected to the leaf switches 215. The spine-leaf network 200 may be managed by Layer 3 routing, with the spine switches 205 configured with mapping tables to optimize forwarding. As a result, the devices 220-235 are the same number of network segments away from each other regardless of the spine switch 205 that handles the traffic between a first device 220 and a second device 235, resulting in predictable and consistent delay or latency over the network and between devices.

On top of this leaf-spine architecture 200, VXLAN segments can be overlaid. Devices and VMs within the same VXLAN segment can communicate with each other, but this communication is isolated from other VXLAN segments, similar to VLAN isolation. Data to be carried over a VXLAN segment can be associated with a VXLAN network identifier and encapsulated (typically within a UDP datagram). Because each VXLAN segment is isolated, VXLAN can also be thought of as a tunneling scheme. Each VXLAN segment can provide a stateless tunnel. An end point of a VXLAN tunnel is called a VXLAN Tunnel End Point, or VTEP. For example, a first VTEP 217-1 of a VXLAN tunnel can be located at a first leaf switch 215-1 that provides access to a first server 220-1 and a second VTEP 217-2 of the same VXLAN tunnel can be a located at a leaf switch 215-3 that provides access to a second server 220-2. The first server 220-1 and the second server 220-2 may each consider the other to be part of a local layer 2 network, even though they could be in different locations within a data center. VTEPs may also be hypervisors in a server platform.

When the first server 220-1 wants to send packets to the second server 220-2, the first leaf switch 215-1 looks in a local routing table for a match. If it finds a match that exists behind another VTEP (e.g., a VTEP at the third leaf switch 215-3), the packets are encapsulated with VXLAN and UDP headers and encapsulated again with outer IP and Ethernet headers for transport over the leaf-spine network. Because each path from the first leaf switch 215-1 to the third leaf switch 215-3 through the spines 205 is approximately the same length and has approximately the same latency, equal-cost multi-path routing (ECMP) may be used such that different packets are transmitted via different spines 205. When the packets arrive at the destination VTEP on the third leaf switch 215-3, the outer Ethernet, IP, UDP, and VXLAN headers are removed, and the third leaf switch 215-3 sends the original packet to the second server 220-2.

Control within a VXLAN overlay network is based on the learning and managing of associations between MAC addresses of devices and Internet Protocol (IP) addresses of VTEPs. One way the VXLAN network can manage these associations is via data plane learning, where the associations are learned through traffic flooding. Control plane mechanisms, such as EVPN (Ethernet Virtual Private Network) can also be deployed to learn and manage these associations. Using EVPN as the control plane of VXLAN can enable VTEPs to be automatically discovered and VXLAN tunnels to be automatically established, simplifying network deployment and expansion, and reducing flooding traffic on the network. EVPN uses BGP (Border Gateway Protocol) formatted information to exchange endpoint device MAC and IP address information for VTEPs. This enables a MAC address (associated with a device or VM) to move from one location in the network to another location in the network or data center relatively easily (for example because the VM is moved from one bare-metal server to another). More broadly speaking, these control plane mechanisms may be a way to track MAC mobility. Some networks use both data plane mechanisms in a first part of the network and control plane mechanisms in a second part of the network.

Figure 3:
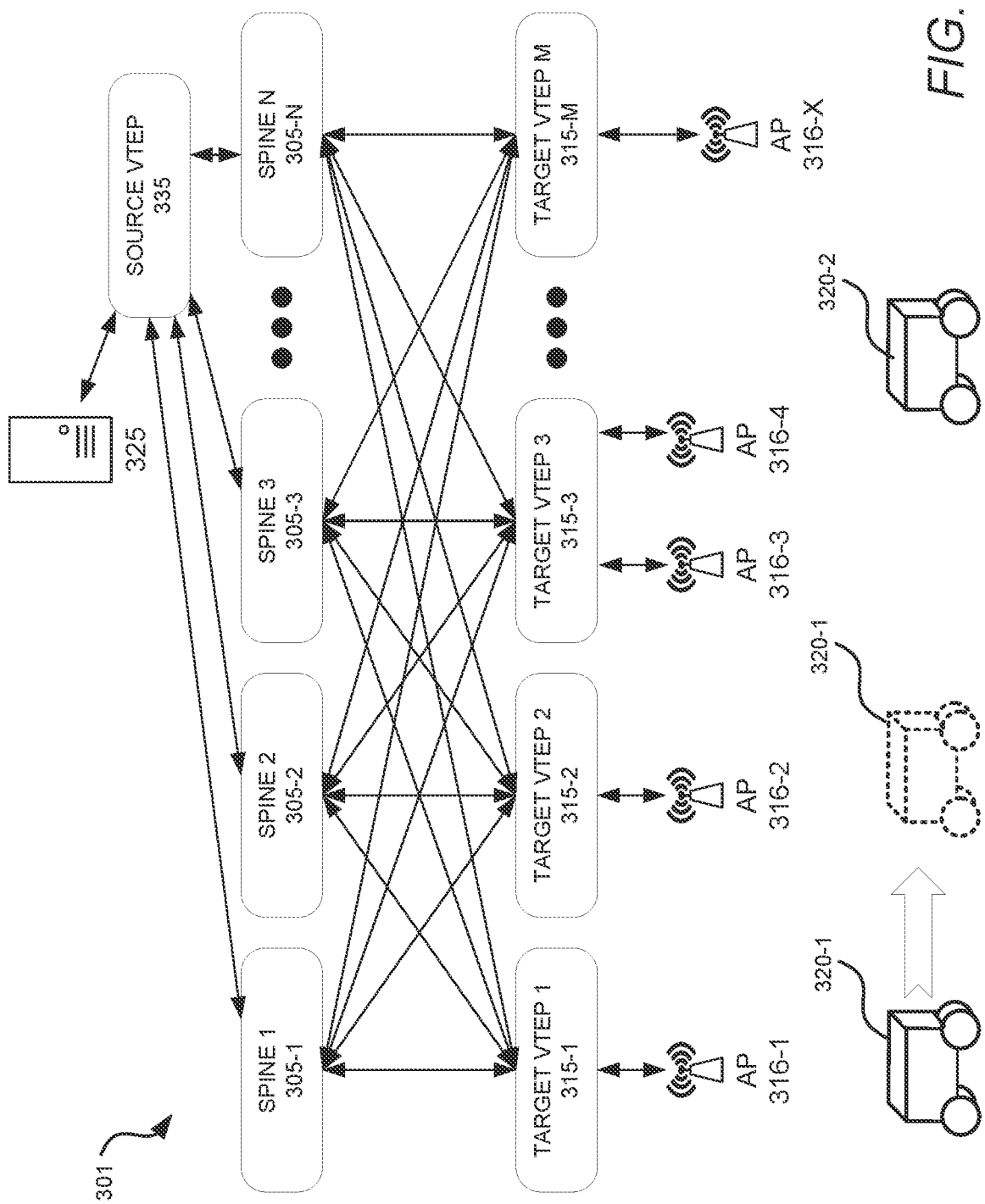
FIG. 3 is a block diagram illustrating an example of a networking system according to aspects of the present disclosure.

The above discussed developments in networking systems and computing devices have been applied in various forms to large warehouse environments in which there are a number of network-connected mobile devices (both mobile human workers and/or mobile robots). FIG. 3 is an example of such an environment 300.

In FIG. 3, it can be seen that a leaf-spine fabric 301 may be used for sending and receiving data between a source 325 at one end of the fabric 301 and mobile devices 320 at the other end of the fabric 301 that communicate with the network via a set of deployed access points 316. The mobile devices 320 illustrated in the example environments herein are shown as mobile robots, though one skilled in the art will understand the concepts discussed herein are also applicable to other mobile devices, such as smartphones, tablets, laptop computers, or other electronic devices configured for wireless networking. The source 325 (which may be, e.g., a server, controller, or other end device that wants to communicate with the mobile devices 320) may be coupled to a VTEP on a first leaf switch 335, and for ease of discussion the source leaf switch will be referred to herein as a source VTEP 335. Similarly, each of the access points 316 may be connected to VTEPs on other leaf switches 315-1 to 315-M, which for ease of discussion will be referred to herein as target VTEPs 315 or destination VTEPs 315. Although the source VTEP 335 and target VTEPs 315 are referred to as such, it is to be understood that bidirectional communication between the source VTEPs 335 and target VTEPs 315 may be achieved. Additionally, with reference to the above, although each access point 316 is shown as connected to a single target VTEP 315, in reality each access point 316 is communicatively coupled to a port of a leaf switch 315, and the port and access point 316 can be associated with multiple VTEPs (because the access point 316 is a source or destination of traffic for multiple VXLAN segments).

The fabric 301 may be configured to use BGP EVPN control plane mechanisms to manage associations between the MAC network addresses of the mobile devices 320 and the target VTEPs 315 (and by extension the access point 316) that serve as the next hops in a forwarding path for traffic destinated for the mobile devices 320. For example, a first mobile device 320-1 may be associated and authenticated under 802.11 with a first access point 316-1, and the BGP EVPN control plane mechanisms may result in the fabric 301 understanding that data destined for the mobile device 320-1 should be forwarded to the first access point 316-1 via a first target VTEP 315-1.

As discussed above, the mobile devices 320 may move between locations within the warehouse, for example to perform various tasks (picking and packing, inventory delivery, and so on) and leave and enter coverage areas of different access points 316. For example, the first mobile device 320-1 may decide to roam to and associate with a second access point 316-2 that communicates with the fabric 301 via a second target VTEP 315-2. As such, the data destined for the mobile device 320-1 from the source VTEP 335 should now be delivered to the second target VTEP 315-2 instead of the first target VTEP 315-1. The second target VTEP 315-2 will learn the MAC address of the first mobile device 320-1 and advertise that data destinated for the first mobile device 320-1 can be routed to the second target VTEP 315-2. Depending on the configuration of the fabric 301 and the leaf switches, the first target VTEP 315-1 will withdraw its route to the first mobile device 320-1 either by aging out the route or in response to the advertisement of the second target VTEP 315-2. The BGP EVPN control plane mechanisms will signal these route changes throughout the fabric 301 and to the source VTEP 335.

While this transition takes place, e.g., up until the source VTEP 335 learns of the change from the first target VTEP 315-1 to the second target VTEP 315-2, the source VTEP 335 might continue traffic for the first mobile device 320-1 to the (old) first target VTEP 315-2 before it adjusts that the BGP next hop for the first mobile device 320-1 is the second target VTEP 315-2. As a result, the first mobile device 320-1 may experience transient traffic drop while moving between the coverage areas of the first and second access points 316-1 and 316-2 (and the two VTEPs 315-1 and 315-2 that respectively serve the first and second access points 316-1 and 316-2). Additionally, given the increasing size of warehouses and increasing numbers of mobile devices 320 deployed therein, issues related to MAC/IP address mobility from the mobile devices 320 moving around in the warehouse may result in slow convergence of the fabric 301, meaning increased times for the data to be properly forwarded to the new target VTEP. In other words, increased numbers and movements of mobile devices 320 within the network can result in a large number of route changes, which may overwhelm the processing capabilities of the fabric 301 to absorb and respond to these route changes in a timely manner. This can also result in traffic drops within the fabric 301. These traffic drops can potentially disrupt or disable the mobile devices 320 in their operation and/or affect operational efficiency, especially at scale. Even a traffic outage of as little as 50 milliseconds (ms) per mobile device 320 as it transitions from a first access point 316-1 to a second access point 316-2 could, in the aggregate, result in significant inefficiencies within the warehouse. Various factors affect the performance of the network, such as the number of VTEPs deployed within the BGP EVPN fabric, the number of access points 316 and/or VTEPs associated with each mobile device, the number of mobile devices deployed, the movement rate of the mobile devices, the ratio between access points 316 and leaf switches, and other factors. For example, one way to address this problem might be to have multiple access points 316 serviced by the same target VTEP (as seen with third and fourth access points 316-3 and 316-4 and third target VTEP 315-3). These access points might be able to serve a coverage area and hence reduce VTEP transitions. However, this solution may not scale well.

Accordingly, aspects of the present disclosure provide solutions to reduce or eliminate traffic drops in networking systems with mobile devices that transition between wireless access points of the networking system.

Figure 4:
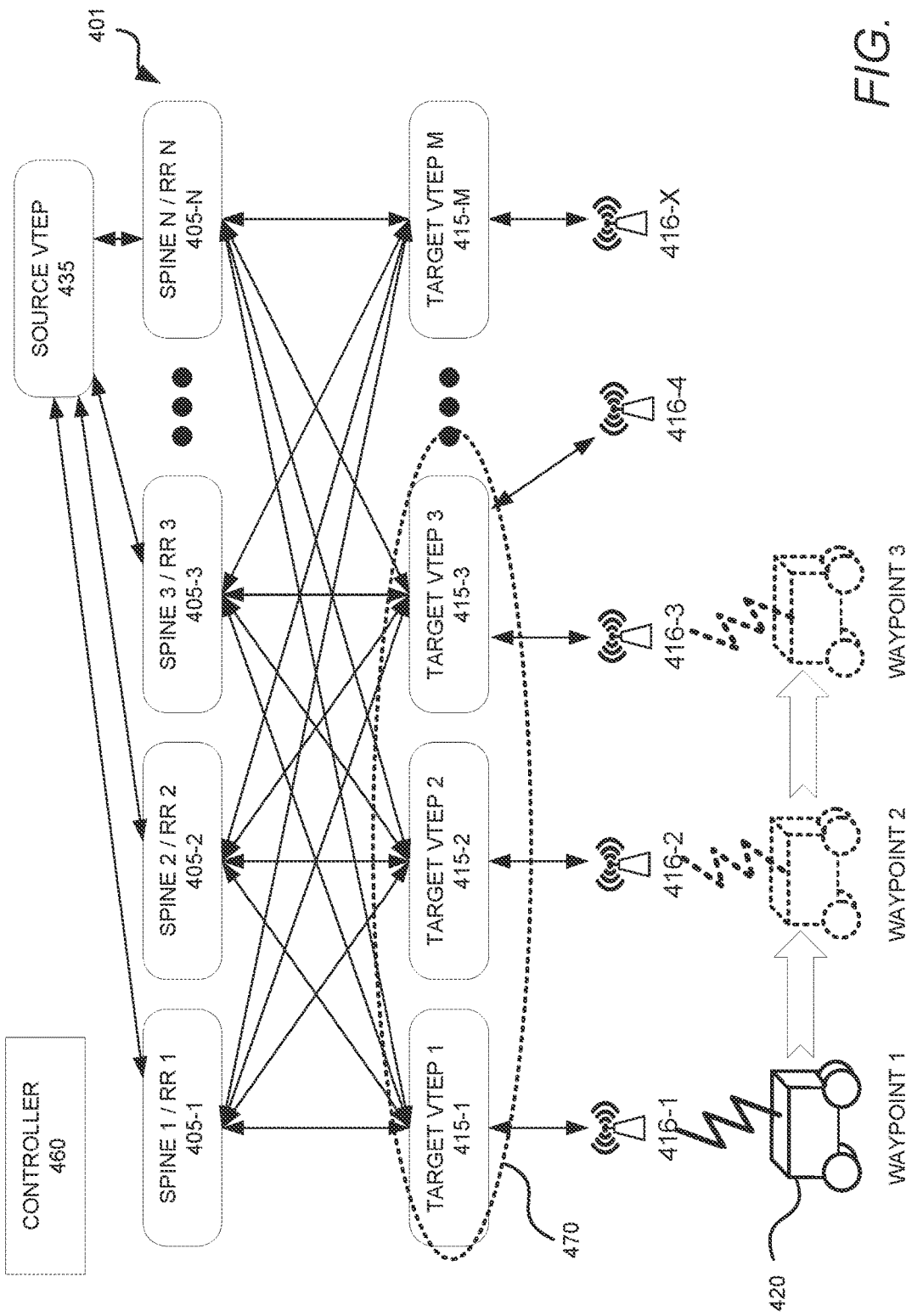
FIG. 4 is a block diagram illustrating an example of a networking system according to aspects of the present disclosure.
Figure 5A:
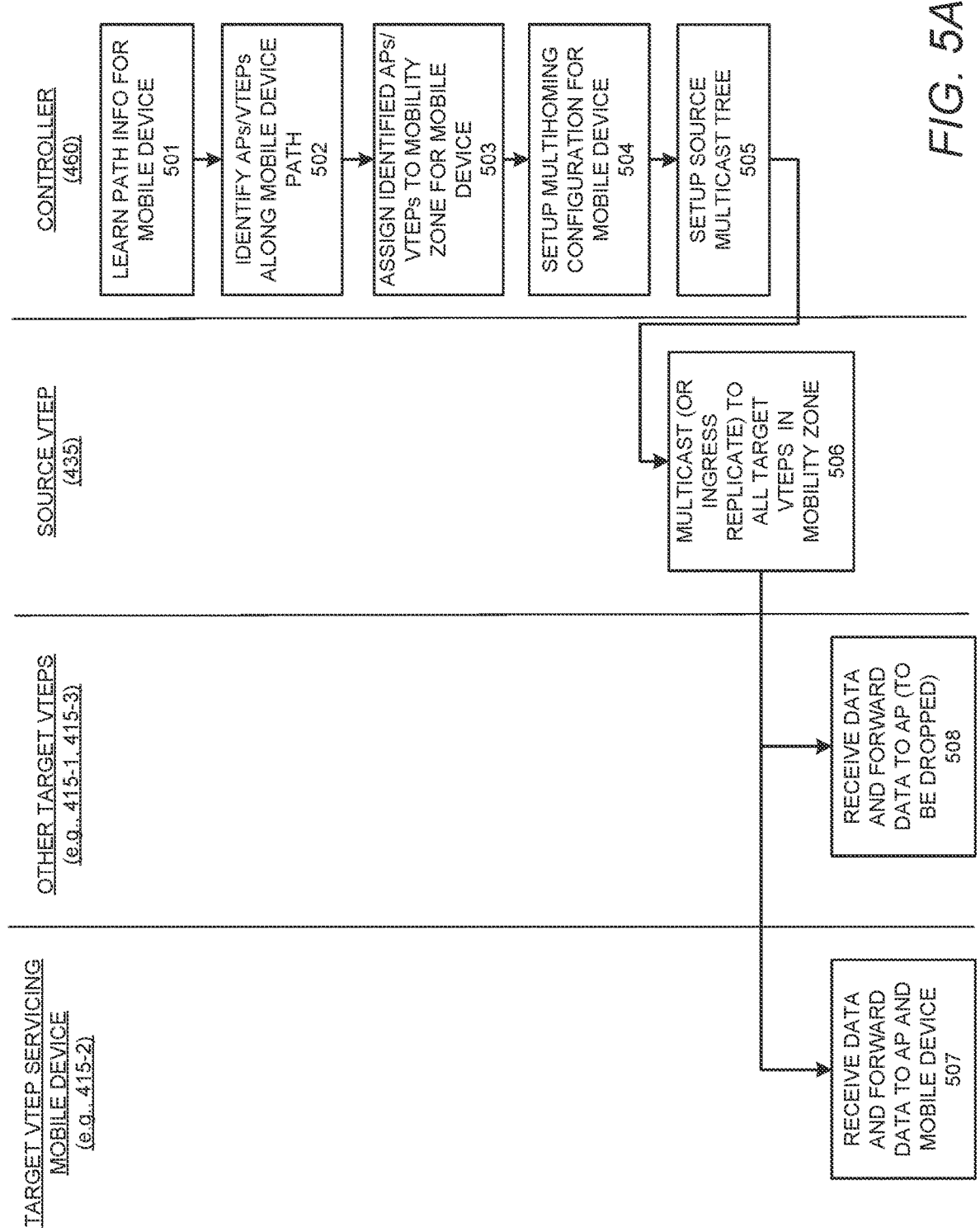
FIG. 5A is a flowchart illustrating operations in methods of configuring the networking environment of FIG. 4 and/or methods of communicating within the configured networking environment.

FIG. 4 is an example of a networking environment 400 according to aspects of the present disclosure. FIG. 5A is a flowchart of operations in methods of configuring the networking environment of FIG. 4 and/or methods of communicating within a configured networking system to reduce or eliminate traffic drops during mobile device transitions therein, according to aspects of the present disclosure. As with FIG. 3, it can be seen in FIG. 4 that networking environment 400 includes a leaf-spine fabric 401 of spine switches 405 and leaf switches (which are underlaying target VTEPs 415) that may be used for sending and receiving data between a source VTEP 435 and the target VTEPs 415. The target VTEPs 415 provide bidirectional data traffic flow between the fabric 401 and a plurality of access points 416 servicing mobile devices 420 within a physical space such as a warehouse. The spines 405 may be configured as route reflectors (RR). The leaf-spine fabric 401 may be located remote from the physical space.

Additionally present in the networking environment 400 is a controller 460, which may be coupled to one of the underlying leaf switches (though this link is not shown in the figures to improve their clarity). Referring to FIGS. 4 and 5A together, the controller 460 may be configured to learn information about a path of each mobile device 420 in the physical space (block 501). For example, a first mobile device 420-1 may travel from a first waypoint (Waypoint 1) in the coverage area of a first access point 416-1 to a second waypoint (Waypoint 2) in the coverage area of a second access point 416-2 in order to complete a task at the second waypoint. The first mobile device 420-1 may then travel to a third waypoint (Waypoint 3) in the coverage area of a third access point 416-3 in order to complete a task at the third waypoint, and so on. In some situations, the mobile device may travel to a waypoint or within a coverage area of an access point 416 without completing a task at the waypoint or within the coverage area, which may also be part of the path information learned by the controller 460.

The path information may be communicated to the controller 460 and/or learned by the controller 460 from a variety of sources. As one example, a mobile device 420 may be assigned one or more tasks, and/or may be assigned to one or more locations to perform as-needed or assigned tasks therein. A server, a controller (e.g., a controller of the mobile devices 420) may communicate task or location information to the controller 460 indicating the tasks or locations that the mobile device 420 (or a user thereof) has been assigned. This communication may be once (e.g., the mobile device 420 has been assigned a fixed and repeating series of tasks or locations and does not deviate therefrom), periodic (e.g., the mobile device 420 has been assigned these tasks or locations to be performed over the next time period of seconds, minutes, hours, etc.), and/or responsive to task assignments (e.g., the mobile device 420 has just been assigned this task to be performed or these locations to perform tasks therein), as examples. The controller 460 may then derive an expected path between the tasks and the access points 416 and/or target VTEPs 415 along the path. In some embodiments, the mobile devices 420 may communicate task information to the controller 460. In some embodiments, the controller 460 may be integrated into a different device (e.g., a controller of the mobile devices 420).

In some embodiments, paths may be calculated for the mobile devices 420 by a physical traffic management device (to reduce travel congestion in high-traffic areas of the warehouse), and these paths may be communicated to the controller 460. In some embodiments, multiple paths between waypoints, tasks, and/or coverage areas may be learned for a mobile device 420 by the controller 460 to account for potential differences to a mobile device's 420 travel in the physical space.

The controller 460 may be configured to identify the different target VTEPs 415 and/or access points 416 that service the locations within the physical space through which the mobile device 420 will travel to perform the tasks assigned to the mobile device 420 or the user thereof (block 502). The identified target VTEPs 415 and/or access points 416 may be assigned by the controller 460 to a mobility zone 470 for the mobile device 420 (block 503). In some embodiments, this assignment occurs prior to the mobile device 420 entering a coverage area of one of the access points 416 or being serviced by one of the target VTEPs 415 of the mobility zone 470, or prior to the mobile device 420 transitioning from a coverage area of one of access points (e.g., first access point 416-1) to a coverage area of another of the access points (e.g., second access point 416-2).

Using the mobility zone 470 and the identified target VTEPs 415 and/or access points 416 assigned thereto, the controller 460 may be configured to setup a multihoming configuration for the mobile device 420 using the identified target VTEPs 415 (block 504). The multihoming configuration may be communicated through the fabric 401 via a control plane mechanism (e.g., BGP EVPN). The multihoming configuration may indicate that the mobile device 420 may be found at two or more different network locations, in this case the identified target VTEPs 415.

The controller 460 may establish a multicast group between the source VTEP 435 and the identified target VTEPs 415 (block 505). The source VTEP 435 may multicast data destined for the mobile device 420 via the established multihoming configuration and multicast group (block 506). In some embodiments, rather than establish a multicast group between the source VTEP 435 and the identified target VTEPs 415, the controller 460 may instead transmit a message to the source VTEP 435 to perform ingress replication and transmit a separate unicast stream to each identified target VTEP 415 of the mobility zone 470.

The identified target VTEPs 415 would then forward the traffic to the respective access points 416 within the mobility zone 370 (blocks 507 and 508). Each target VTEP 415 may use unicast forwarding if there is only one access point 416 associated with the target VTEP. In some embodiments, multiple access points 416 may be associated with the same target VTEP (the third target VTEP 415-3 has both the third access point 416-3 and the fourth access point 416-4 associated therewith) and as such the target VTEP associated with multiple access points 416 may do multicast forwarding, broadcasting, or local replication of the traffic.

The networking environment of FIG. 4 and the operations of FIG. 5A reduce traffic drops due to mobile device mobility because, so long as the mobile device 420 remains within coverage areas associated with the mobility zone 470, there is no traffic drop due to the mobile device 320 roaming between coverage areas of access points 416 (because traffic is transmitted to and available at both the original access point 416 and the target access point 416). There are also limited convergence issues resulting from MAC mobility of the mobile device 420, because the fabric 401 has been configured with the multihoming configuration setup by the controller 460 and thus expects to be able to reach the mobile device 420 via the identified target VTEPs and access points of the mobility zone 470.

Figure 5B:
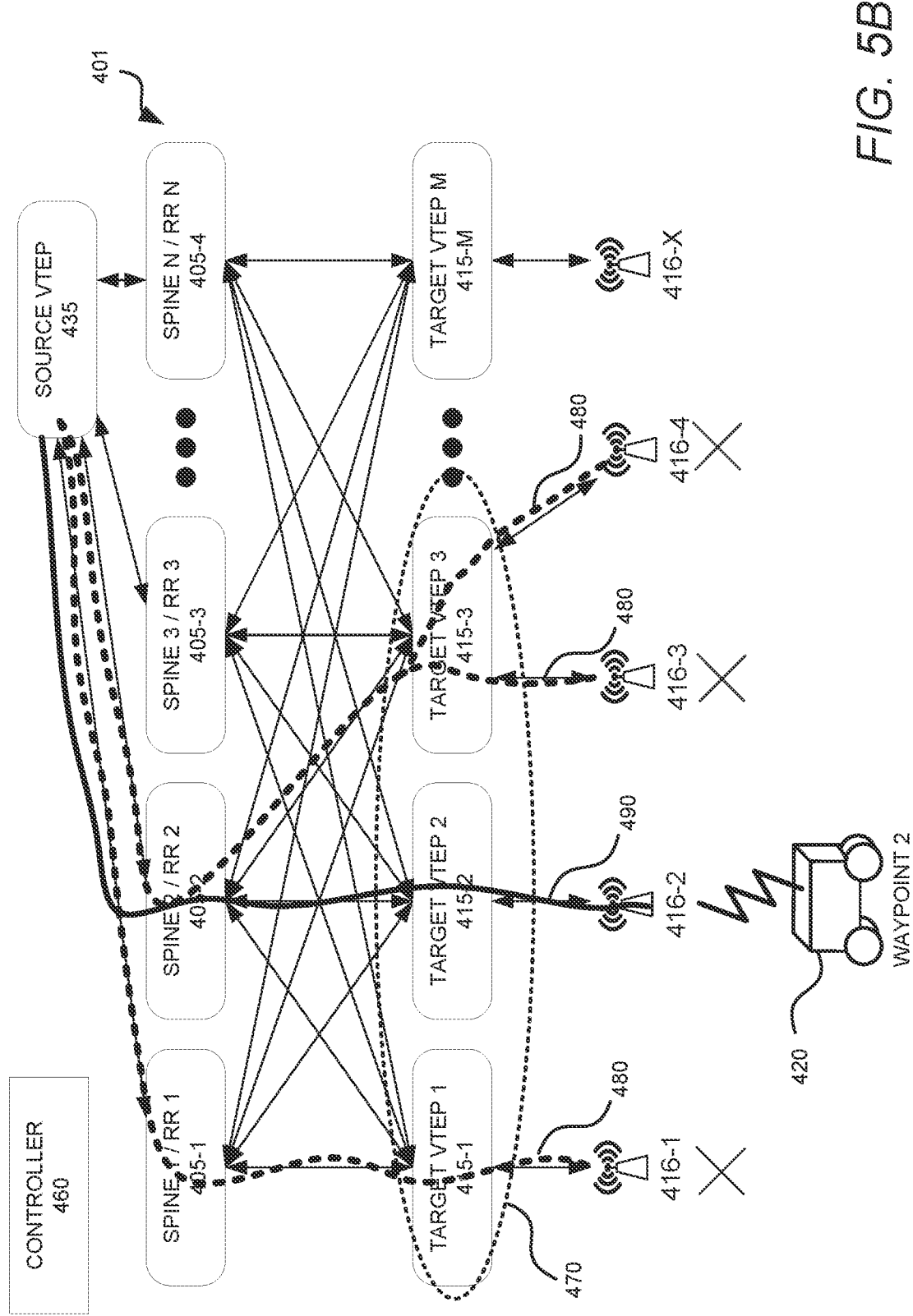
FIG. 5B is a block diagram illustrating the networking environment of FIG. 4 at a specific time point as configured according to some of the operations of FIG. 5A.

Referring now also to FIG. 5B, which illustrates the networking environment 400 of FIG. 4 at a specific time point as configured according to some of the operations of FIG. 5A, it may be seen that the mobile device 420 is connected to only one access point 416 at a given time (here, the second access point 416-2 because the mobile device 420 is at the second waypoint). Only data traffic 490 communicated from source VTEP 435 to the second target VTEP 415-2 and the second access point 416-2 is received by the mobile device 420 (block 507 of FIG. 5A), while the data traffic 480 communicated from source VTEP 435 to first target VTEP 415-1 and the first access point 416-1 and the data traffic 480 communicated from source VTEP 435 to third target VTEP 415-3 and the third access point 416-3 (and in some embodiments, the fourth access point 416-4) is not communicated to the mobile device 420 and is instead dropped by the access points 416-1, 416-3, 416-4 (block 508 of FIG. 5A). Thus, although the networking environment of FIG. 4 and the operations of FIG. 5A reduce traffic drops due to mobile device mobility, it does so through using relatively high amounts of wasted bandwidth.

Figure 6A:
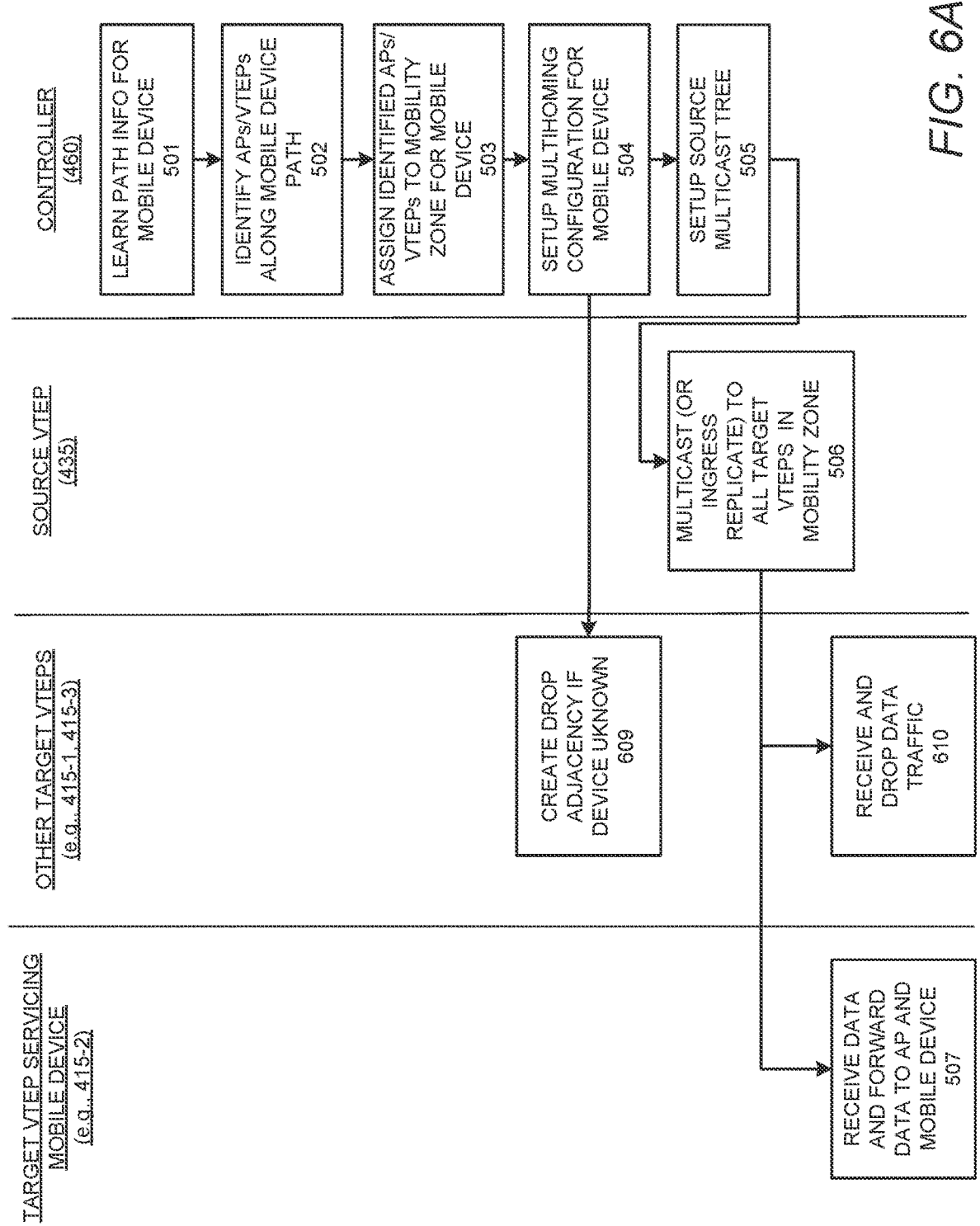
FIG. 6A is a flowchart illustrating operations in methods of configuring the networking environment of FIG. 4 and/or methods of communicating within the configured networking environment.

FIG. 6A is a flowchart of operations in methods of configuring the networking environment of FIG. 4 and/or methods of communicating within a configured networking system to reduce or eliminate traffic drops during mobile device transitions therein, according to aspects of the present disclosure. Blocks 501-507 of FIG. 6A are substantially similar to the corresponding blocks of FIG. 5A and duplicate description thereof is therefore omitted in favor of the above. In a networking environment configured according to FIG. 6A, each target VTEP 415 may be configured to drop traffic rather than forward the traffic to the access points 416 serviced by the target VTEP 415 if the destination MAC address for the traffic has not been learned by the target VTEP 415 via data plane learning (blocks 609 and 610).

Figure 6B:
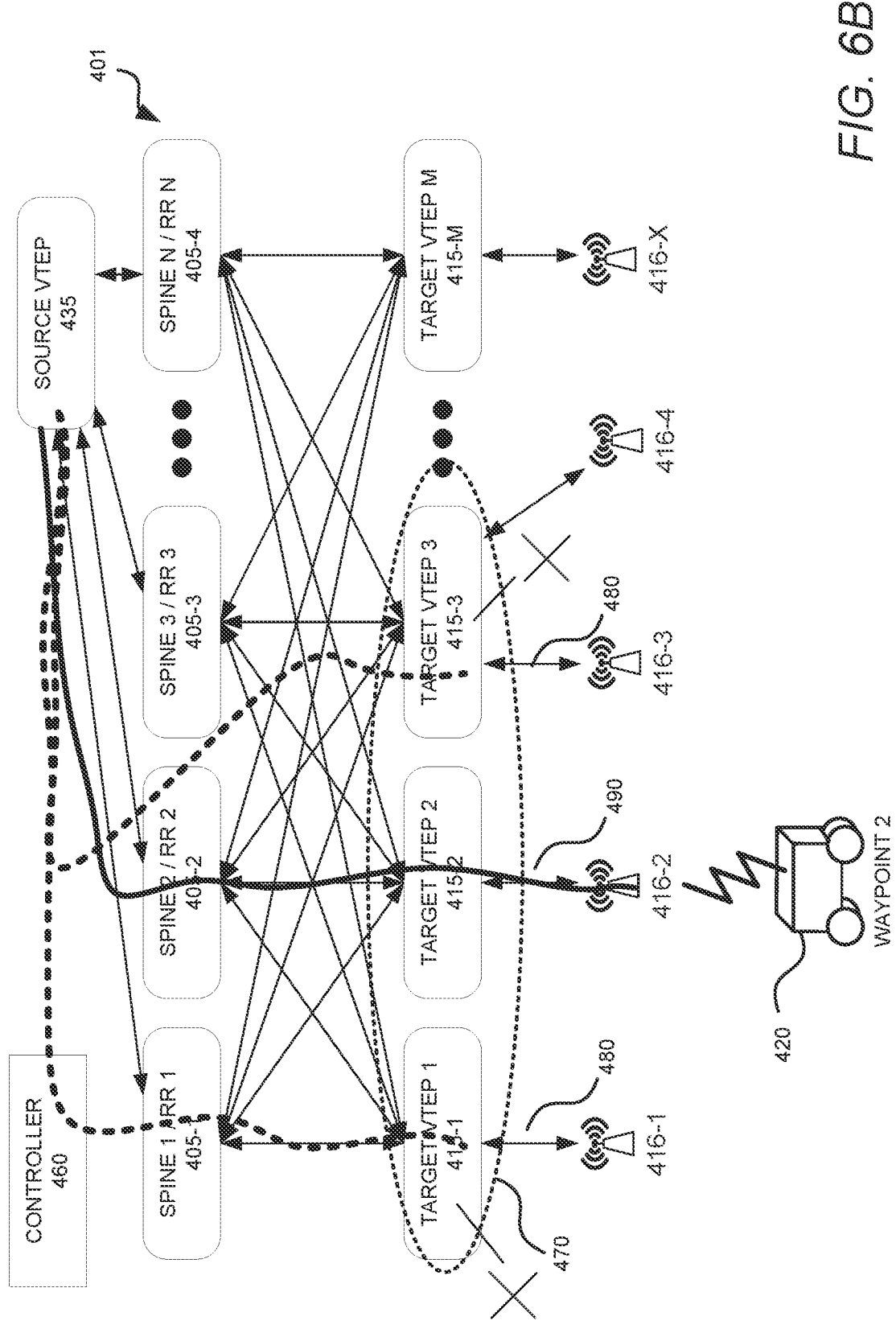
FIG. 6B is a block diagram illustrating the networking environment of FIG. 4 at a specific time point as configured according to some of the operations of FIG. 6A.

In other words, if the target VTEP 415 has not learned the MAC address of the mobile device 420 via the data plane, then the target VTEP 415 may conclude that the mobile device 420 is not actually connected to any access points 416 connected to the target VTEP 415. In that case, the target VTEP 415 may create a drop adjacency in the forwarding plane associated with the MAC address of the mobile device 420 (block 609). Referring now also to FIG. 6B, which illustrates the networking environment 400 of FIG. 4 at a specific time point as configured according to some of the operations of FIG. 6A, it may be seen again that the mobile device 420 is connected to only one access point 416 at a given time (here, the second access point 416-2 because the mobile device 420 is at the second waypoint). Only data traffic 490 communicated from source VTEP 435 to the second target VTEP 415-2 and the second access point 416-2 is received by the mobile device 420 (block 507 of FIG. 5A), while the data traffic 680 communicated from source VTEP 435 to first target VTEP 415-1 and the data traffic 680 communicated from source VTEP 435 to third target VTEP 415-3 are dropped by the respective target VTEPs rather than being forwarded by the access points 416-1, 416-3, 416-4 (block 610 of FIG. 6A) due to the created drop adjacencies (block 609 of FIG. 6A).

The networking environment of FIG. 4 and the operations of FIG. 6A may reduce traffic drops due to mobile device mobility because, so long as the mobile device 420 remains within coverage areas associated with the mobility zone 470, there is no traffic drop due to the mobile device 420 roaming between coverage areas of access points 416 (because traffic is transmitted to and available at both the original access point 416 and the target access point 416). There are also limited convergence issues resulting from MAC mobility of the mobile device 420, because the fabric 401 has been configured with the multihoming configuration setup by the controller 460 and thus expects to be able to reach the mobile device 420 via the identified target VTEPs and access points of the mobility zone 470. On the other hand, although the networking environment of FIG. 4 and the operations of FIG. 6A reduce traffic drops due to mobile device mobility, and do so in a way that uses less bandwidth available to the access points 416 than the operations of FIG. 5A, the operations of FIG. 6A nevertheless result in relatively high amounts of wasted bandwidth within the leaf-spine architecture.

Figure 7:
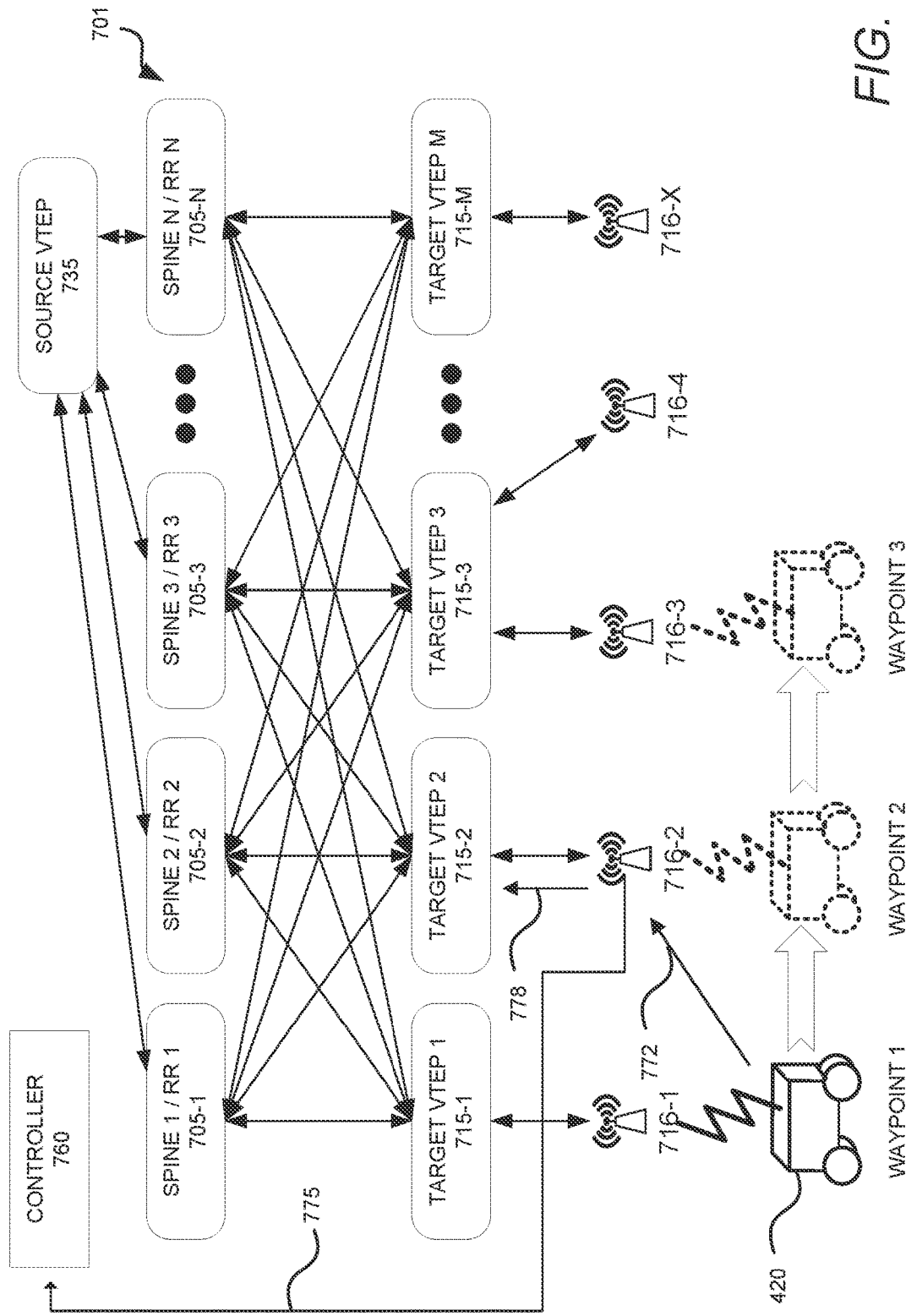
FIG. 7 is a block diagram illustrating an example of a networking system according to aspects of the present disclosure.
Figure 8A:
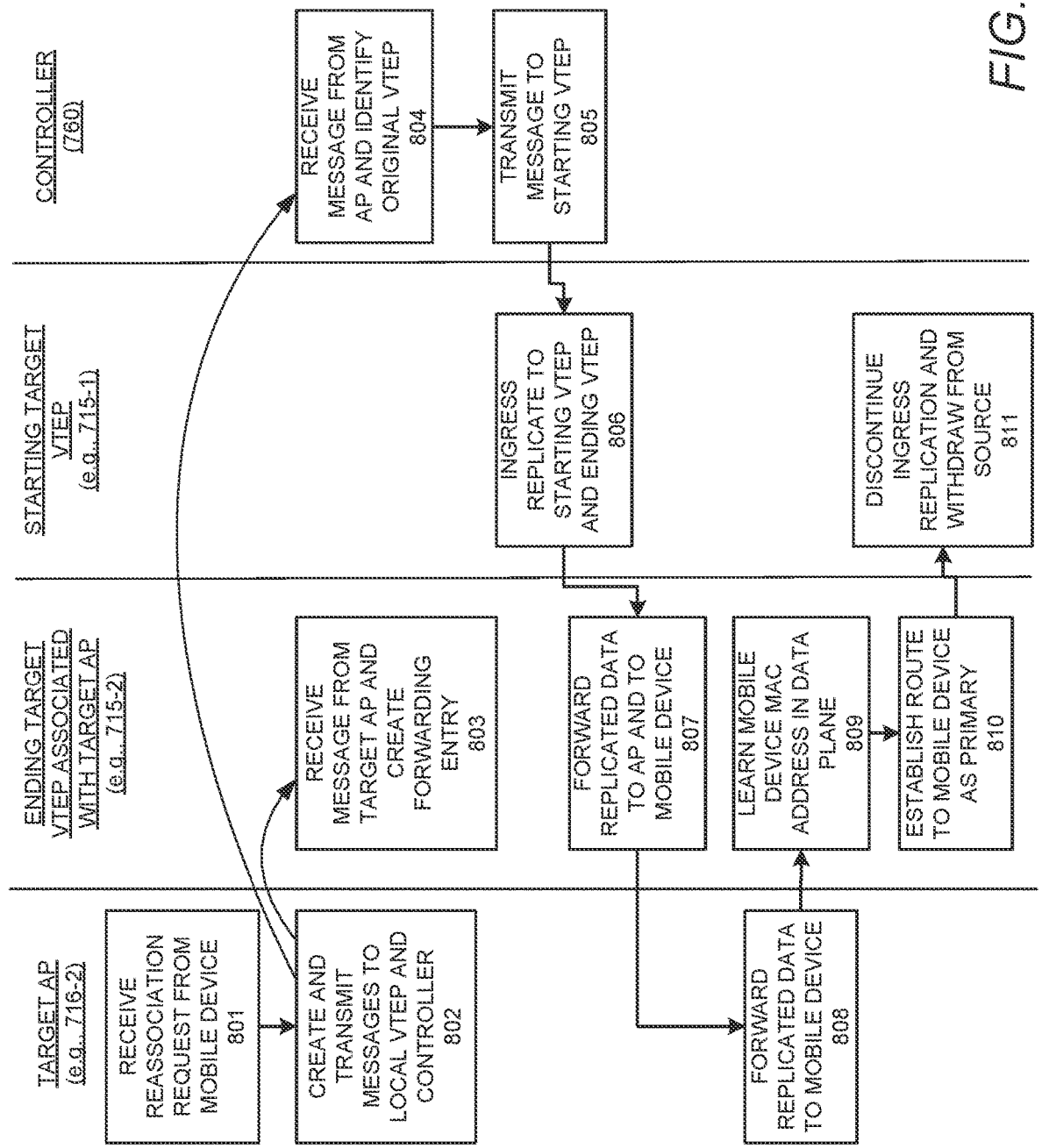
FIG. 8A is a flowchart illustrating operations in methods of configuring the networking environment of FIG. 7 and/or methods of communicating within the configured networking environment.

FIG. 7 is an example of a networking environment 700 according to aspects of the present disclosure. FIG. 8A is a flowchart of operations in methods of configuring the networking environment of FIG. 7 and/or methods of communicating within a configured networking system to reduce or eliminate traffic drops during mobile device transitions therein, according to aspects of the present disclosure. As with FIG. 4, it can be seen in FIG. 7 that networking environment 700 includes a leaf-spine fabric 701 of spine switches 705 and leaf switches (which are underlaying target VTEPs 715) that may be used for sending and receiving data between a source VTEP 735 and the target VTEPs 715. The target VTEPs 715 provide bidirectional data traffic flow between the fabric 701 and a plurality of access points 716 servicing mobile devices 420 within a physical space such as a warehouse. The leaf-spine fabric 701 may be located remote from the physical space.

Additionally present in the networking environment 700 is a controller 760, which may be coupled to one of the underlying leaf switches (though this link is not shown in the figures to improve their clarity). The controller 760 of FIG. 7 may be configured differently than the controller 460 of FIG. 4, though in some embodiments, a single controller may be selectively configurable according to FIGS. 4-6B or FIGS. 7-8B, or may be configured according to both sets of figures. The access points 716 of FIG. 7 may also be configured differently than the corresponding access points 416 of FIG. 4.

Referring to FIGS. 7 and 8A together, a target access point 716 may be configured to receive a reassociation request from a roaming mobile device (block 801) and, in response to the received reassociation request, create and transmit messages to both the target VTEP 715 that services the target access point 716 and to the controller 760 (block 802). Herein, the target access point 716 refers to the access point 716 with which the mobile device 420 intends to establish a wireless communication session, and the ending target VTEP 715 refers to the target VTEP 715 that services the target access point 716. In the example of FIG. 7, the mobile device 420 intends to establish a wireless communication session with the second access point 716-2, and the mobile device 420 sends the reassociation request 772 to the second access point 716-2. In response, the second access point 716-2 (i.e., the ending access point) creates and sends a controller message 775 to the controller 760 and a VTEP message 778 to the ending target VTEP 715 (here, the second target VTEP 715-2) that services the second access point 716-2.

The ending target VTEP 715-2 associated with the target access point 716-2 may be configured to create a forwarding entry for the mobile device 420 in response to the VTEP message 778 (block 803). This forwarding entry would point towards the target access point 716-2 as if the ending target VTEP 715-2 had learned the MAC address for the mobile device 420 in the data plane. In some embodiments, the VTEP message 778 may include the MAC address or other address associated with the mobile device 420, and an address associated with the target access point 716-2.

The controller 760 may be configured to identify a current (i.e., pre-roaming or starting) access point (here, access point 716-1) and target VTEP (here, starting target VTEP 715-1) associated with the mobile device 420 in response to the controller message (block 804). The pre-roaming access point and VTEP are referred to herein as the starting access point 716 and starting target VTEP 715. In some embodiments, the controller message 775 may include the MAC address or other address associated with the mobile device 420, an address associated with the target access point 716-2, and an identifier of the ending target VTEP 715-2. Blocks 803 and 804 may be performed simultaneously or sequentially in any order.

The controller 760 may be configured to transmit a message to the identified starting target VTEP 715-1 (block 805) to begin ingress replication to the ending target VTEP 715-2, and in response, the starting target VTEP 715-1 may begin performing the ingress replication (block 806). This instantiates a replicated data stream that is transmitted from the starting target VTEP 715-1 through the fabric 701 to the ending target VTEP 715-2. Because the ending target VTEP 715-2 has a forwarding entry therein, the replicated data stream is forwarded to the target access point 716-2 (block 807). Until the association and authentication process is completed between the roaming mobile device 420 and the target access point 716-2, the replicated data stream may be dropped by the target access point 716-2 and the mobile device is instead served by the starting access point 716-1 (via the 'original' data stream). Once the association and authentication process is completed, the replicated data may be immediately forwarded to the mobile device 420 (block 808). Additionally, the ending target VTEP 715-2 may learn that the mobile device 420 has established a communication session with the target access point 716-2 (for example, by learning the MAC address of the mobile device 420 via the data plane) (block 809). Based on this, the ending target VTEP 715-2 may be configured to perform a control plane procedure, such as generating an advertisement indicating status and availability of a route to the mobile device 420 (block 810). This advertisement will propagate through the fabric 701, eventually reaching the source VTEP 735, which will begin transmitting packets toward the ending target VTEP 715-2.

The starting target VTEP 715-1 may be configured to withdraw from the source and discontinue ingress replication to the ending target VTEP 715-1 (block 811). In some embodiments, the starting target VTEP 715-1 may be configured to withdraw due to expiry of a timer indicating that activity for the mobile device 420 has not occurred in the starting target VTEP 715-1 for a predetermined period of time (e.g., the mobile device 420 MAC address may age out in the starting VTEP 715-1). In some embodiments, the advertisement indicating status and availability of a route to the mobile device 420 through the ending target VTEP 715-2 may indicate a higher priority value or sequence number, which could indicate to the starting target VTEP 715-1 that the ending target VTEP 715-2 is part of a path to the mobile device 420. In some embodiments, subsequent to withdrawing from the source a delay period may be instantiated by the starting target VTEP 715-1 prior to ending ingress replication to account for propagation and convergence delays.

Figure 8B:
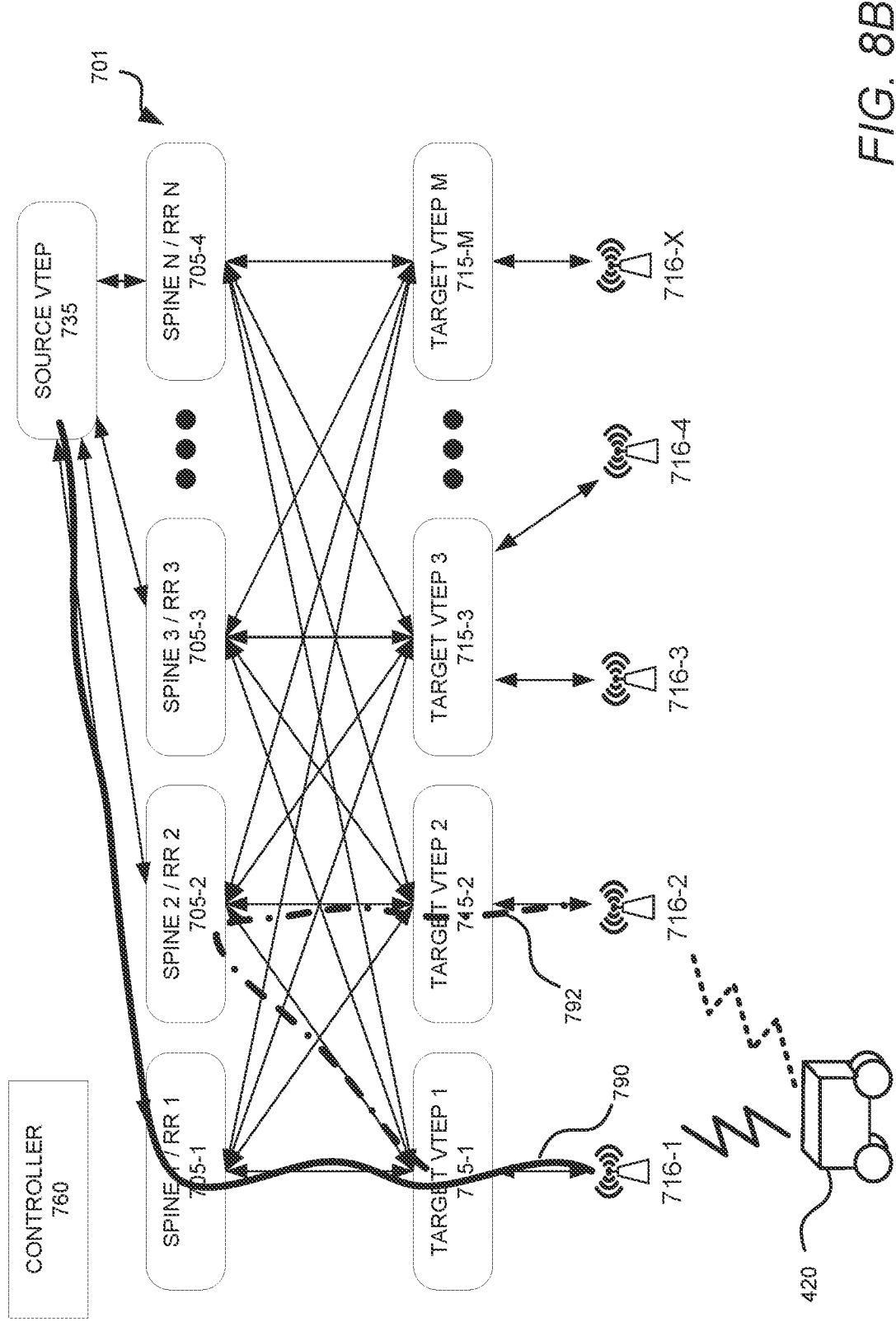
FIG. 8B is a block diagram illustrating the networking environment of FIG. 7 at a specific time point as configured according to some of the operations of FIG. 8A.

Referring now also to FIG. 8B, which illustrates the networking environment 700 of FIG. 7 at a specific time point as configured according to some of the operations of FIG. 8A, it may be seen that while data traffic between the mobile device 420 and the network is via a first access point 716-1, the mobile device 420 may be in the process of roaming to a second access point 716-2. Data traffic 790 is communicated from source VTEP 735 to the first target VTEP 715-1, which replicates the traffic as data traffic 792 and transmits the traffic via the leaf-spine fabric 701 to the second target VTEP 715-2. Until the mobile device 420 completes the process of reassociation with the second access point 716-2, data traffic 792 is not communicated to the mobile device 420 and is instead dropped by the second access points 716-2 or the second target VTEP 715-2; once the reassociation process is completed, the replicated data traffic 792 may be transmitted presently to the mobile device 420, reducing and potentially eliminating traffic drops resulting from the reassociation process.

The networking environment of FIG. 7 and the operations of FIG. 8A may reduce traffic drops due to mobile device mobility because traffic is replicated between the starting and ending target VTEPs during the reassociation (roaming) process, enabling the mobile device 420 to receive traffic from either target VTEP on both sides of the reassociation process. Bandwidth waste as compared to FIGS. 4-6B is also reduced, as replication is limited to during the reassociation process. On the other hand, the access points 716 require additional configuration to communicate the controller message 775 to the controller 760 and the VTEP message 778 to the ending target VTEP.

Figure 9:
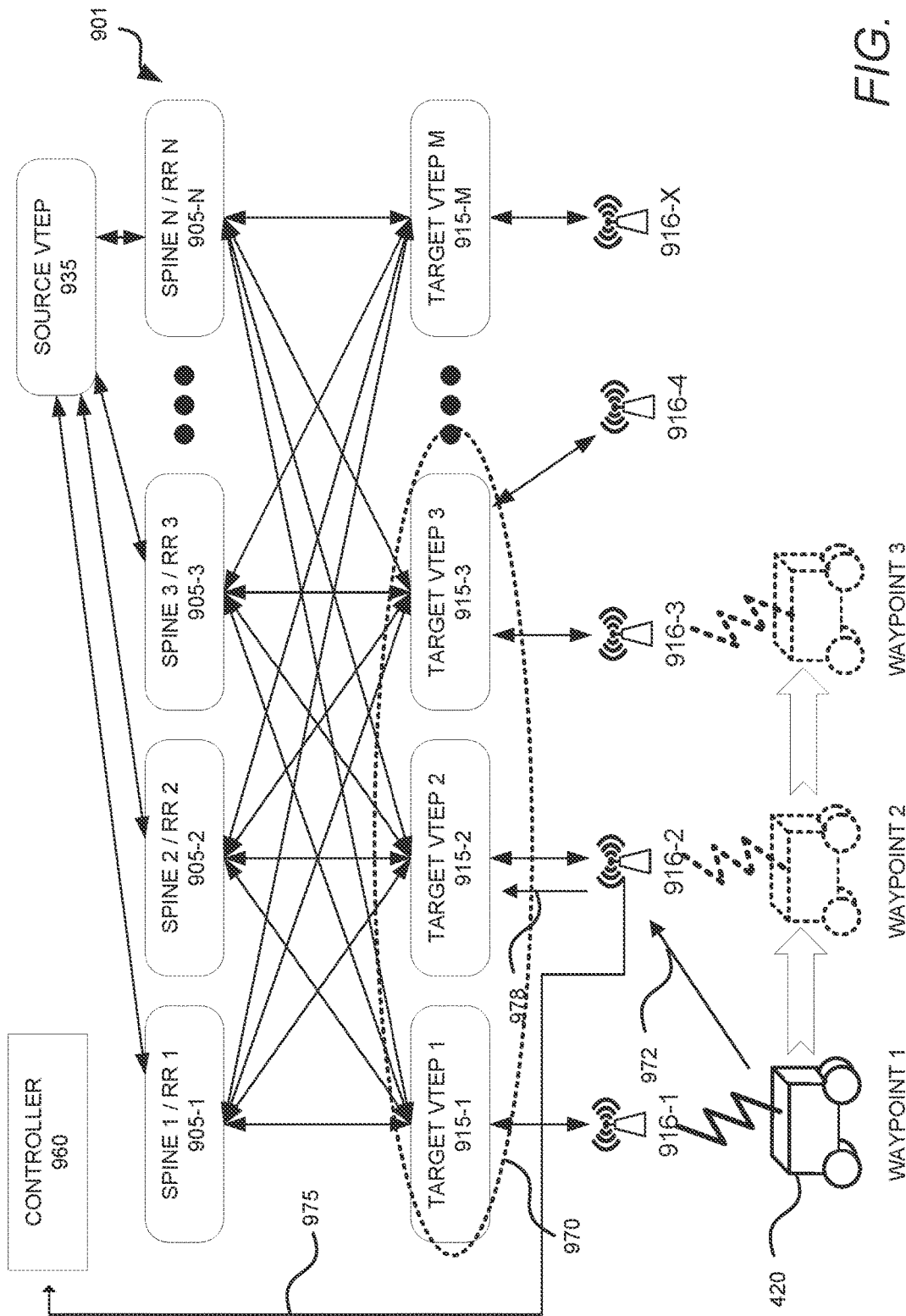
FIG. 9 is a block diagram illustrating an example of a networking system according to aspects of the present disclosure.
Figure 10:
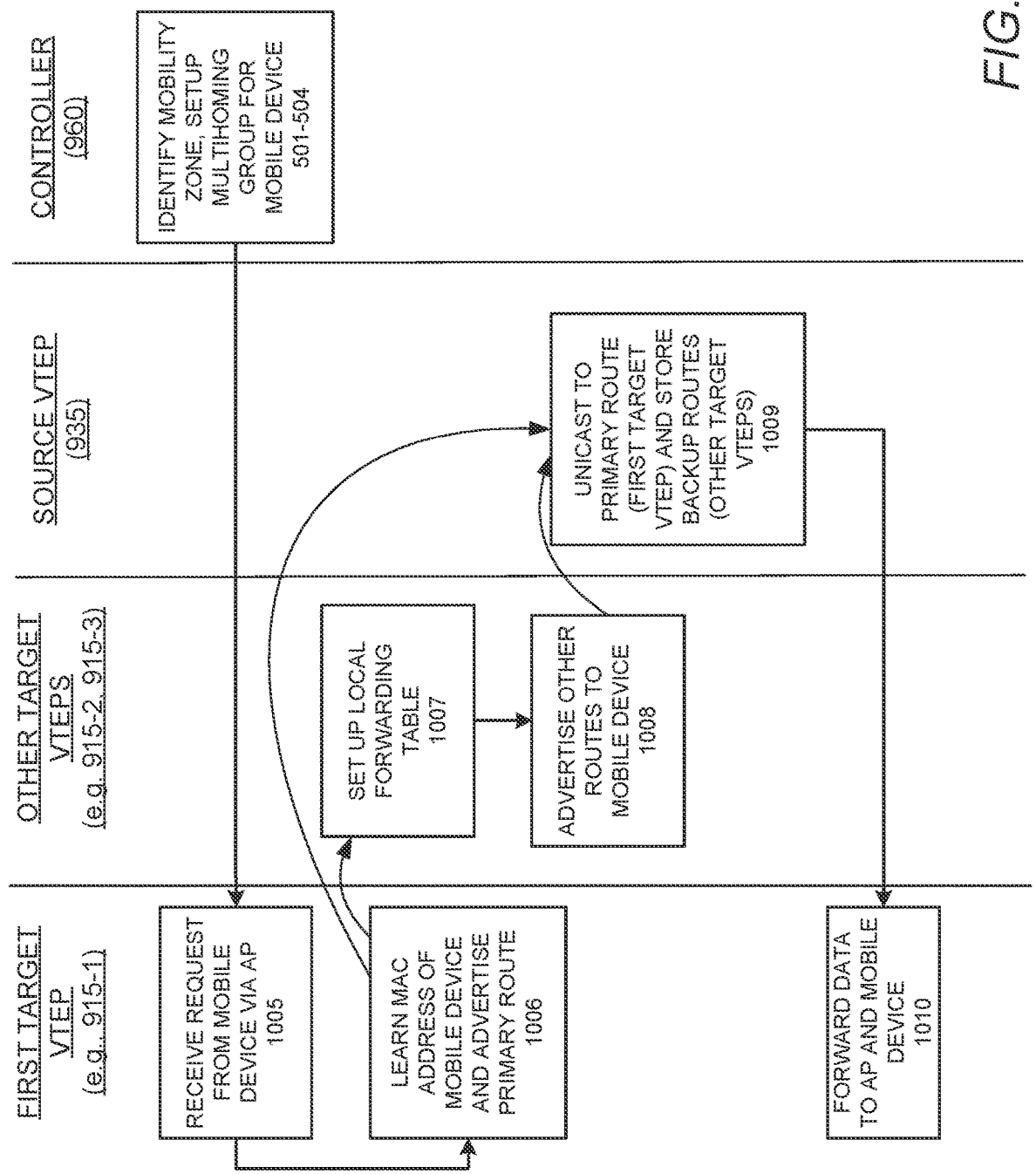
FIGS. 10 and 11A are flowcharts illustrating operations in methods of configuring the networking environment of FIG. 9 and/or methods of communicating within the configured networking environment.
Figure 11A:
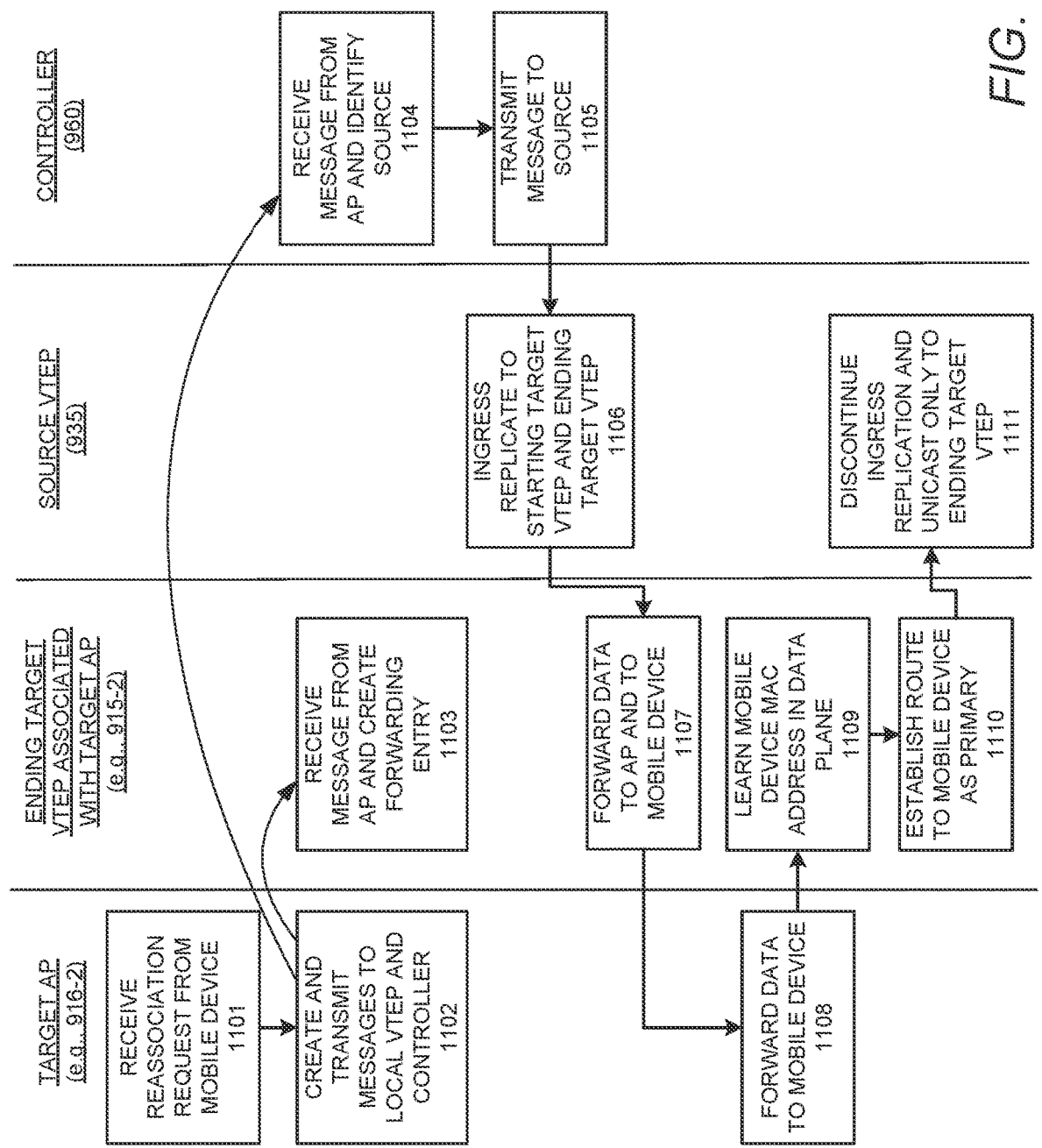

FIG. 9 is an example of a networking environment 900 according to aspects of the present disclosure. FIGS. 10 and 11A are flowcharts of operations in methods of configuring the networking environment of FIG. 9 and/or methods of communicating within a configured networking system to reduce or eliminate traffic drops during mobile device transitions therein, according to aspects of the present disclosure. The networking environment 900 of FIG. 9 and the operations shown in the flowcharts of FIGS. 10 and 11A may combine aspects of the environments and operations of FIGS. 4-8B.

As with FIGS. 3, 4, and 7, it can be seen in FIG. 9 that networking environment 900 includes a leaf-spine fabric 901 of spine switches 905 and leaf switches (which are underlaying target VTEPs 915) that may be used for sending and receiving data between a source VTEP 935 and the target VTEPs 915. The target VTEPs 915 provide bidirectional data traffic flow between the fabric 901 and a plurality of access points 916 servicing mobile devices 420 within a physical space such as a warehouse. The leaf-spine fabric 901 may be located remote from the physical space.

Additionally present in the networking environment 400 is a controller 960, which may be coupled to one of the underlying leaf switches (though this link is not shown in the figures to improve their clarity). Referring to FIGS. 9 and 10 together, the controller 960 may be configured to learn information about a path of each mobile device 420 in the physical space, identify the different target VTEPs 915 and/or access points 916 that service the locations within the physical space through which the mobile device 420 will travel, create a mobility zone 970, and setup a multihoming configuration for the mobile device 420 using the identified target VTEPs 915 (block 501-504 of FIG. 10). These operations may be substantially similar to operations described with reference to blocks 501-504 from FIG. 5A, and reference is made to the above description of the same. The operations are shown as a single block in FIG. 10 in order to improve the clarity of the figure.

During or after the creation of the mobility zone 970 and multihoming configuration for the mobile device 420, and during operation of the mobile device 420, it will establish a connection with (associate with) one of the access points (e.g., first access point 916-1) and send a request, such as an ARP request, to the target VTEP associated with the access point (block 1005). The first target VTEP 915-1 may be configured to perform a control plane procedure, such as generating an advertisement indicating status and availability of a route to the mobile device 420 (block 1006). This advertisement will propagate through the fabric 901 through the spines 905 of the network.

Because the other target VTEPs 915 (e.g., second target VTEP 915-2, third target VTEP 915-3) are part of the multihoming configuration for the mobile device 420, the other target VTEPs 915 of the multihoming configuration may be configured to receive the advertisement of the availability of the route to the mobile device 420 through the first target VTEP 915-1 and set up their respective forwarding tables in a way that indicates the mobile device 420 is available through their associated access points 916 (block 1007). These routes are also advertised within the fabric 901 (block 1008). The routes advertised by the remaining target VTEPs 915 of the multihoming configuration may have a lower priority or sequence value than the route advertised by the initial target VTEP 915-1.

The source VTEP 935 may be configured to receive these route advertisements and establish a unicast traffic flow to the initial target VTEP 915-1 as well as maintain or store a list of the routes via the other target VTEPs 915-2, 915-3 as backup routes. (block 1009). As a result, the traffic is forwarded as a unicast stream through the initial target VTEP 915-1 and the first access point 916-1 (block 1010).

Referring to FIGS. 9 and 11A together, as well as with reference to aspects of FIG. 8A that are similar to those shown in FIG. 11A, during operation a mobile device may decide to roam from the initial access point 916-1 to a target access point 916-2. The target access point 916-1 may be configured to receive a reassociation request from a roaming mobile device (block 1101) and, in response to the received reassociation request, create and transmit messages to both the target VTEP 915 that services the target access point 916 and to the controller 960 (block 1102).

The ending target VTEP 915-2 associated with the target access point 916-2 may be configured to create a forwarding entry for the mobile device 420 in response to the VTEP message 978 (block 1103). This forwarding entry would point to a local port towards the target access point 916-2 as if the ending target VTEP 915-2 had learned the MAC address for the mobile device 420 in the data plane. In some embodiments, the VTEP message 978 may include the MAC address or other address associated with the mobile device 420, and an address associated with the target access point 916-2.

The controller 960 may be configured to identify a current source VTEP (here, starting target VTEP 935) associated with the mobile device 420 in response to the controller message 975 (block 1104), for example using the established multihoming configuration for the mobile device 20. In some embodiments, the controller message 975 may include the MAC address or other address associated with the mobile device 420, an address associated with the target access point 916-2, and an identifier of the ending target VTEP 915-2. Blocks 1103 and 1104 may be performed simultaneously or sequentially in any order.

The controller 960 may be configured to transmit a message to source VTEP 935 (block 1105) to begin ingress replication to the ending target VTEP 915-2, and in response, the source VTEP 935 may begin performing the ingress replication (block 1106), sending duplicate data streams to the starting target VTEP 915-1 and ending target VTEP 915-2. Because the ending target VTEP 915-2 has a forwarding entry therein, the replicated data stream received thereby is forwarded to the target access point 916-2 (block 1107). Until the association and authentication process is completed between the roaming mobile device 420 and the target access point 916-2, the replicated data stream may be dropped by the target access point 916-2 and the mobile device is instead served by the starting access point 916-1 (via the 'original' data stream). Once the association and authentication process is completed, the replicated data may be immediately forwarded to the mobile device 420 (block 1108). Additionally, the ending target VTEP 915-2 may learn that the mobile device 420 has established a communication session with the target access point 916-2 (for example, by learning the MAC address of the mobile device 420 via the data plane) (block 1109). Based on this, the ending target VTEP 915-2 may be configured to perform a control plane procedure, such as generating an advertisement indicating status and availability of a route to the mobile device 420 (block 1110). This advertisement will propagate through the fabric 901, eventually reaching the source VTEP 935, which will begin transmitting packets toward the ending target VTEP 915-2. The starting target VTEP 915-1 may be configured to withdraw from the source and discontinue ingress replication to the ending target VTEP 915-1 (block 1111) in a similar manner to block 811 of FIG. 8A.

Figure 11B:
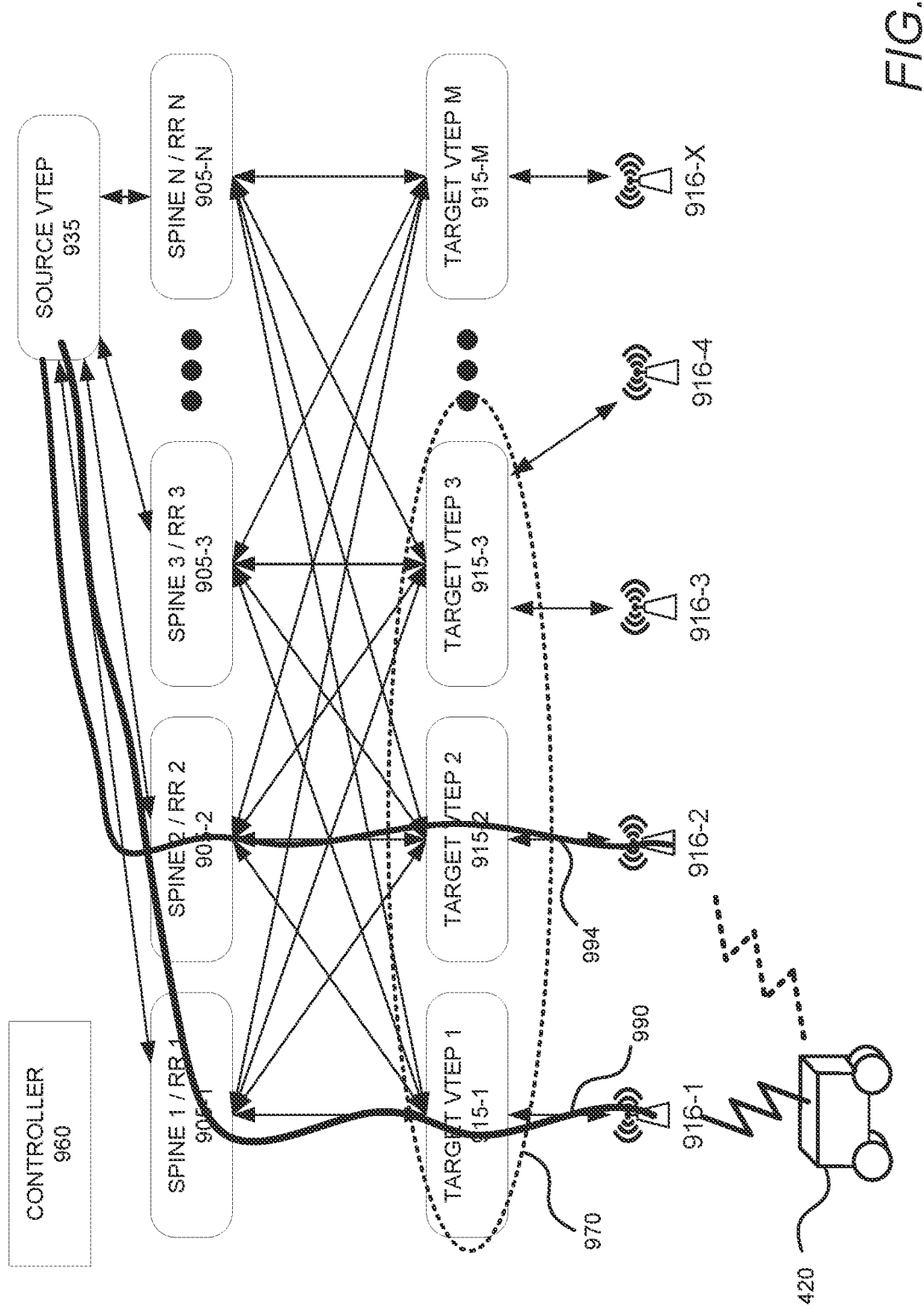
FIG. 11B is a block diagram illustrating the networking environment of FIG. 9 at a specific time point as configured according to some of the operations of FIG. 11A.

Referring now also to FIG. 11B, which illustrates the networking environment 900 of FIG. 9 at a specific time point as configured according to some of the operations of FIG. 11A, it may be seen that while data traffic between the mobile device 420 and the network is via a first access point 916-1, the mobile device 420 may be in the process of roaming to a second access point 916-2. Data traffic is replicated by the source VTEP 935 and communicated to the first target VTEP 915-1 as data traffic 990 and communicated to the second target VTEP 915-2 as data traffic 994. Until the mobile device 420 completes the process of reassociation with the second access point 916-2, data traffic 994 is not communicated to the mobile device 420 and is instead dropped by the second access points 916-2 or the second target VTEP 915-2; once the reassociation process is completed, the replicated data traffic 994 may be transmitted presently to the mobile device 420, reducing and potentially eliminating traffic drops resulting from the reassociation process.

The networking environment of FIG. 9 and the operations of FIGS. 10 and 11A may reduce traffic drops due to mobile device mobility because traffic is replicated between the starting and ending target VTEPs during the reassociation (roaming) process, enabling the mobile device 420 to receive traffic from either target VTEP on both sides of the reassociation process. Bandwidth waste as compared to FIGS. 4-6B is also reduced, as replication is limited to during the reassociation process.

Figure 12:
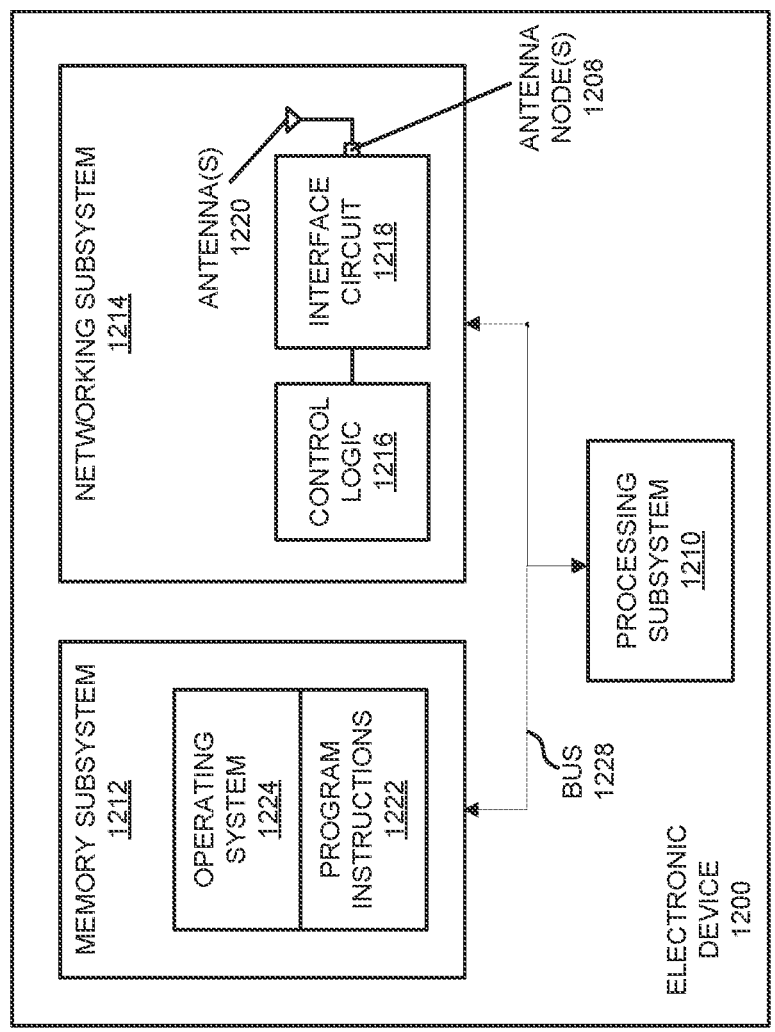
FIG. 12 is a block diagram of an electronic device (e.g., an access point or a client device) according to aspects of the present disclosure.

FIG. 12 is a block diagram illustrating an electronic device 1200 in accordance with some embodiments. The electronic device 1200 may be, for example, one of the access points 110 or one of the client devices 120 illustrated in FIG. 1, the spine switches and leaf switches of the underlying network illustrated in FIG. 2, and the mobile devices and controllers of e.g., FIGS. 3, 4, 7, and 9. The electronic device 1200 includes a processing subsystem 1210, a memory subsystem 1212, and a networking subsystem 1214. Processing subsystem 1210 includes one or more devices configured to perform computational operations. Memory subsystem 1212 includes one or more devices for storing data and/or instructions. In some embodiments, the instructions may include an operating system and one or more program modules which may be executed by processing subsystem 1210.

Networking subsystem 1214 includes one or more devices configured to couple to and communicate on a wired and/or wireless network (i.e., to perform network operations), including: control logic 1216, an interface circuit 1218 and one or more antennas 1220 (or antenna elements). While FIG. 12 includes an antenna 1220, in some embodiments electronic device 1200 includes one or more nodes, such as nodes 1208, e.g., a connector, which can be coupled to one or more antennas 1220 that are external to the electronic device 1200. Thus, electronic device 1200 may or may not include the one or more antennas 1220. Networking subsystem 1214 includes at least a networking system based on the standards described in IEEE 802.11 (e.g., a Wi-Fi networking system).

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting frames and/or scanning for frames transmitted by other electronic devices.

Processing subsystem 1210, memory subsystem 1212, and networking subsystem 1214 are coupled together using bus 1228. Bus 1228 may include an electrical, optical, and/or electro-optical connection that the subsystems can use to communicate commands and data among one another.

Electronic device 1200 can be (or can be included in) any electronic device with at least one network interface. For example, electronic device 1200 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present disclosure may be implemented in hardware or software, and in a wide variety of configurations and architectures. For example, at least some of the operations in the communication techniques may be implemented using program instructions 1222, operating system 1224 (such as a driver for interface circuit 1218) or in firmware in interface circuit 1218. Alternatively or additionally, at least some of the operations in the communication techniques may be implemented in a physical layer, such as hardware in interface circuit 1218.

Embodiments of the present disclosure have been described above with reference to the accompanying drawings, in which embodiments of the disclosure are shown. The inventive concepts may, however, be embodied in many different forms and should not be construed as limited to the embodiments set forth herein. Rather, these embodiments are provided so that this disclosure will be thorough and complete, and will fully convey the scope of the disclosure to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method comprising:
    learning information related to a path that a mobile device will travel in a physical space;
    identifying a plurality of access points having coverage areas that provide service to locations along the path and a plurality of networking tunnel endpoints servicing the plurality of access points;
    assigning the plurality of networking tunnel endpoints to a mobility zone associated with the mobile device; and
    transmitting data from a source to at least two of the networking tunnel endpoints of the mobility zone.

2. The method of claim 1, further comprising establishing a multicast group using the plurality of networking tunnel endpoints assigned to the mobility zone,
    wherein transmitting the data from the source to the at least two networking tunnel endpoints of the mobility zone comprises transmitting the data via a multicast stream.

3. The method of claim 1, wherein transmitting the data from the source to the at least two networking tunnel endpoints of the mobility zone comprises transmitting the data via at least one replicated unicast stream.

4. The method of claim 1, further comprising forwarding the data received by the networking tunnel endpoints to access points of the plurality of access points serviced by the receiving networking tunnel endpoints.

5. The method of claim 4, further comprising dropping, by at least one of the access points, the data forwarded thereto based on a lack of a connection between the access point and the mobile device.

6. The method of claim 1, further comprising dropping, by one of the receiving networking tunnel endpoints, the data received thereby based on a lack of a connection between the mobile device and any access point serviced by the one networking tunnel endpoint.

7. The method of claim 1, wherein the transmitting the data from the source to the at least two networking tunnel endpoints of the mobility zone is performed responsive to receiving a reassociation request from the mobile device at a second access point of the plurality of access points.

8. The method of claim 7, wherein the data is transmitted from the source to the at least two networking tunnel endpoints of the mobility zone via first and second unicast data streams.

9. The method of claim 8, further comprising:
    receiving an indication that the mobile device has reassociated with the second access point of the plurality of access points; and
    discontinuing one of the first and second unicast data streams.

10. The method of claim 9, wherein the indication comprises a route advertisement indicating that the mobile device is available via the second access point or indicating that the mobile device is available via a networking tunnel endpoint servicing the second access point.

11. The method of claim 9, wherein the indication comprises a withdrawal request from the source by a first access point.

12. A system, comprising:
    a plurality of access points configured to provide wireless communication to a plurality of mobile devices within a physical space;
    a plurality of networking tunnel endpoints that provide service the plurality of access points with service to a network;
    a controller, configured to:
        learn information related to a path that a first mobile device will travel within the physical space;
        identify at least some of the plurality of access points as having coverage areas that provide service to locations along the path and at least two networking tunnel endpoints that service the identified access points; and
        assign at least two of the networking tunnel endpoints to a mobility zone associated with the mobile device; and
    a source configured to:
        transmit data to the first mobile device via the at least two networking tunnel endpoints assigned to the mobility zone.

13. The system of claim 12, wherein the source is configured to transmit the data to the at least two networking tunnel endpoints of the mobility zone via a multicast stream.

14. The system of claim 12, wherein the source is configured to transmit the data to the at least two networking tunnel endpoints of the mobility zone via at least one replicated unicast stream.

15. The system of claim 12, wherein the at least two networking tunnel endpoints are configured to forward data received from the source to the access points serviced by the at least two networking tunnel endpoints.

16. The system of claim 15, wherein at least one access point is configured to drop the forwarded data based on a lack of a connection between the at least one access point and the mobile device.

17. The system of claim 12, wherein at least one of the networking tunnel endpoints is configured to drop the data from the source received by the networking tunnel endpoint based on a lack of a connection between the mobile device and any access point serviced by the one networking tunnel endpoint.

18. The system of claim 12, wherein the mobile device is a network-enabled mobile robot.

19. A system, comprising:
    a plurality of access points configured to support wireless communication within a physical space;
    a plurality of networking tunnel endpoints that provide the plurality of access points with service to a network;
    a source configured to transmit data to a first mobile device via the network;
    a controller, configured to:
        receive a message transmitted to the controller from a second access point of the plurality of access points based on a reassociation request received by the second access point from the first mobile device;
        identify the source; and
        transmit a message to the source;
    wherein the source is configured to transmit data to at least two networking tunnel endpoints in response to receiving the message from the controller.

20. The system of claim 19, wherein the message from the controller indicates at least one of the at least two networking tunnel endpoints.

* * * * *